US012764624B2

(12) United States Patent
Dash et al.

(10) Patent No.: US 12,764,624 B2
(45) Date of Patent: Oct. 13, 2026

(54) DYNAMIC CELL RESELECTION PRIORITY IN OPEN RADIO ACCESS NETWORKS

(71) Applicant: Radisys Corporation, Hillsboro, OR (US)

(72) Inventors: Nalinikanta Dash, Puri (IN); Rajendra Prasad Kodaypak, Hillsboro, OR (US); Bhawani Sankar Satpathy, Dhenkanal (IN)

(73) Assignee: Radisys Corporation, Hillsboro, OR (US)

( * ) Notice: Subject to any disclaimer, the term of this patent is extended or adjusted under 35 U.S.C. 154(b) by 566 days.

(21) Appl. No.: 18/464,943

(22) Filed: Sep. 11, 2023

(65) Prior Publication Data

US 2025/0088931 A1 Mar. 13, 2025

(51) Int. Cl.
*H04W 36/24* (2009.01)

(52) U.S. Cl.
CPC .................................. *H04W 36/24* (2013.01)

(58) Field of Classification Search
CPC ....................... H04W 36/24; H04W 36/00838
USPC .......................................... 455/436; 370/338
See application file for complete search history.

(56) References Cited

U.S. PATENT DOCUMENTS

2020/0267632 A1* 8/2020 Lindheimer .......... H04W 48/16
2022/0322192 A1* 10/2022 Parekh .................. H04W 36/22
2023/0319662 A1* 10/2023 Sivaraj .......... H04W 36/008375 455/436
2025/0097825 A1* 3/2025 Chandrashekar ..... H04W 92/14

FOREIGN PATENT DOCUMENTS

WO WO-2022/029064 A1 * 2/2022 ............ H04W 48/18

* cited by examiner

*Primary Examiner* — Marcos Batista
(74) *Attorney, Agent, or Firm* — Stoel Rives LLP

(57) ABSTRACT

A near-RT RIC and an E2 node are configured for dynamically changing a cell reselection priority for a cell provided by an open RAN (O-RAN) radio unit (O-RU) in a fifth generation (5G) communication system. In some embodiments, the near-RT RIC receives input parameters that allow the near-RT RIC to determine the cell reselection priority. The input parameters are provided by one or both the E2 node (via an E2 interface) and a RAN service management and orchestrator (SMO) (via an A1 interface).

18 Claims, 16 Drawing Sheets

| IE/Group Name | Presence | IE Type and Reference |
|---|---|---|
| Message Type | M | |
| RIC Request ID | M | This value will be generated by RIC |
| RAN Function ID | M | This value will be generated by RIC |
| RIC Subscription Details | M | |
| >RIC Event Trigger Definition | M | E2SM-RC Event Trigger Definition Format 1: Message Event |
| >Sequence of Actions | 1.. <maxofRICactionID> | Maximum value of maxofRICactionID can be 16 |
| >>RIC Action ID | M | Indicates the Action ID number, to be unique within the given RIC Request ID |
| >>RIC Action Type | M | Defines the type of action to be executed. Type of action should be set to Report |
| >>RIC Action Definition | O | RIC Action definition will define for reporting RRC Message and Neighbor Relation by E2 node towards RIC when desired condition met |

902 904 906 908 910 912 914

FIG. 9

| IE/Group Name | Presence | Range | IE Type and Reference | Semantics Description |
|---|---|---|---|---|
| Sequence of E2 Node Information Change | M | 1..<maxnoofE2InfoChanges> | Maximum number of E2 Node information changes for which event trigger can be defined. The maximum supported value is 65535 | |
| >Event Trigger Condition ID 1002 | M | | INTEGER (1..65535, ...) | This IE defines an identifier for event trigger conditions configured for a specific Event Trigger style |
| >E2 Node Information Change ID 1004 | M | | INTEGER (1..512, ...) | Value will be encoded as 4 to indicate CPU and Memory utilization |

FIG. 10

1102

| E2 Node Information Change ID | E2 Node Information Change Type 1104 | Description |
|---|---|---|
| 1 | Cell Configuration Change | Triggered when any serving cell's context information defined by the Served Cell Information IE in TS 38.473 [19] clause 9.3.1.10 has changed |
| 2 | Cell Neighbor Relation Change | Triggered when any serving cell's neighbor relation information has changed |
| 3 | Slice Configuration Change | Triggered when slice configuration in any serving cell has changed |
| 4 | CPU and Memory Utilization Change | Triggered when CPU and Memory utilization changes in E2 Node |

FIG. 11

| IE/Group Name | Presence | Range | IE Type and Reference | Semantics Description |
|---|---|---|---|---|
| RIC Style Type | M | | Defines the identifier of a given RIC Style. Value will be encoded as 1 | |
| Action Definition Format | | | | |
| >E2SM-RC Action Definition Format 1 | M | | | Used by REPORT service |

1202

| IE/Group Name | Presence | Range | IE Type and Reference | Semantics Description |
|---|---|---|---|---|
| Parameters to be Reported List | | 1 | Maximum value of maxnoofParametersToReport can be 65535 | |
| >RAN Parameter ID | M | | INTEGER (1.. 232, ...) | Uniquely identifies a specific RAN parameter of a given RIC Control style. Value will be encoded as 4, i.e., CPU and Memory Utilization |

1204

1206

FIG. 12

| RAN Parameter ID | RAN Parameter Name | Semantics Description |
|---|---|---|
| 1 | Cell Context Information | Served Cell Information IE in TS 38.473 [19] clause 9.3.1.10. This shall be used to report Cell Context information |
| 2 | Cell Deleted | This shall be used to report deleted cells. The value shall be set to "True" for the deleted Cell Global ID |
| 3 | Neighbour Relation Table | This shall be used to report neighbor relation information of the serving cells |
| 4 | CPU and Memory utilization information | This shall be used to report CPU and Memory utilization of E2 node |

1302

FIG. 13

| IE/Group Name | Presence | Range | IE Type and Reference |
|---|---|---|---|
| Message Type | M | | |
| RIC Request ID | M | | As provided by RIC in Subscription Request |
| RAN Function ID | M | | As provided by RIC in Subscription Request |
| RIC Actions Admitted List | | 1.. <maxofRICactionID> | MaxofRICactionID is 16 |
| >RIC Action ID | M | | As provided by RIC in Subscription Request |
| RIC Actions Not Admitted List | | 0.. <maxofRICactionID> | MaxofRICactionID is 16 |
| >RIC Action ID | M | | As provided by RIC in Subscription Request |
| >Cause | M | | As per failure at E2 Node |

1402

1408

1404

1406

FIG. 14

| IE/Group Name | Presence | IE Type and Reference |
|---|---|---|
| Message Type | M | |
| 1502 RIC Request ID | M | As provided by RIC in RIC Subscription Request |
| 1504 RAN Function ID | M | As provided by RIC in RIC Subscription Request |
| 1514 RIC Action ID | M | As provided by RIC in RIC Subscription Request |
| 1506 RIC Indication SN | O | This indicates the Indication Sequence Number (SN).Value can be in range of 0 to 65535 |
| 1508 RIC Indication Type | M | RIC Indication Type will be set to Report |
| 1510 RIC Indication Header | M | E2SM-RC Indication Header Format 1 |
| 1512 RIC Indication Message | M | E2SM-RC Indication Message Format 3 |

FIG. 15

1602

| IE/Group Name | Presence | Range | IE Type and Reference | Semantics Description |
|---|---|---|---|---|
| Event Trigger Condition ID | O | | INTEGER (1..65535, ...) | This IE defines an identifier for event trigger conditions configured for a specific Event Trigger style. Same value as defined in RIC Subscription Request will be used in RIC Indication |

1604

| IE/Group Name | Presence | Range | IE Type and Reference | Semantics description |
|---|---|---|---|---|
| Sequence of Cell Information | | 1..<maxnoofCell ID> | | Maximum number of Cell Identifiers supported by Indication Message Format 3 to be reported. Maximum value can be in range of 65535 |
| >Cell Global ID | M | | | For NR cell NR CGI of the cell will be reported |
| >CPU and Memory utilization information | M | | | This IE provides information about CPU usage across different configured core along with memory usage in each of the memory pool |

FIG. 16

1702 1704 1708 1710 1712 1706 1714

| IE/Group Name | Presence | Range | IE Type and Reference | Semantics Description |
|---|---|---|---|---|
| CPU Utilization | O | | | |
| >CPU Core Utlization List | | 1..<maxnoofCores> | Value for maximum no of cores can be 65535 | |
| >>CPU Core ID | M | | INTEGER (1..65535, ...) | CPU Core ID |
| >>CPU Core Name | O | | PrintableString(SIZE(1..150, ...)) | CPU core thread name assigneed |
| >>Perecentage of CPU Usage | M | | INTEGER (1...100) | Percentage of CPU currently in use for mentioned CPU Core ID. E2 Node will trigger RIC Indication when percentage of CPU usage changes by 1 percentage |
| Memory Utilization | O | | | |
| >Memory Pool Utlization List | | 1..<maxnoofmemorypool> | Value for maximum no of memory pools can be 65535 | |
| >>Memory Pool ID | M | | INTEGER (1..65535, ...) | Memory Pool ID of E2 Node |
| >>Perecentage of Memory Usage | M | | INTEGER (1...100) | Percentage of memory currently in use for mention pool. E2 Node will trigger RIC Indication when percentage of memory usage changes by 1 percentage |

FIG. 17

DYNAMIC CELL RESELECTION PRIORITY IN OPEN RADIO ACCESS NETWORKS

TECHNICAL FIELD

This disclosure relates generally to dynamic cell reselection priority in cellular wireless communication systems, and more specifically to dynamic cell reselection priority in open radio access networks.

BACKGROUND INFORMATION

In fifth generation (5G) cellular networks, which are governed by third generation partnership project (3GPP), cell reselection priority refers to a mechanism that determines the priority or preference of different cells (base stations such as gNodeBs, or equivalently "gNBs") for a mobile device to connect to when it is about to perform a cell reselection. Cell reselection is the process by which a mobile device decides to switch its connection from one cell to another in RRC idle or RRC inactive mode. Cell reselection priority is assigned to cells by the network operator or through network planning. Cell reselection priority guides a mobile device's decision-making process when determining which cell it should connect to when moving within a cellular network.

SUMMARY OF THE DISCLOSURE

In some embodiments, an apparatus of a near-real-time radio access network (RAN) intelligent controller (near-RT RIC) comprises a data storage device to store one or more input parameters received via one or more of an E2 interface or an A1 interface; and one or more processors to dynamically determine, based on the one or more input parameters, a cell reselection priority for a cell provided by an open RAN (O-RAN) radio unit (O-RU) in a fifth generation (5G) communication system.

In some embodiments, a method, performed by a near-RT RIC in O-RAN 5GS, of changing a cell reselection priority and sub-priority for intra-frequency neighbor cells, inter-frequency neighbor cells, or inter-RAT neighbor cells, entails engaging in an E2 setup establishment with an E2 node; engaging in an A1 connection establishment with a RAN service management and orchestrator (SMO); participating in a RIC subscription procedure with the E2 node; participating in a query policy procedure with the SMO; receiving one or more input parameters from one or more of the E2 node and the SMO; and dynamically determining a cell reselection priority and sub-priority based on the one or more input parameters received from one or more of the E2 node or the SMO.

In some embodiments, a method, performed by an E2 node in an O-RAN 5GS, of changing a cell reselection priority and sub-priority for intra-frequency neighbor cells, inter-frequency neighbor cells, or inter-RAT neighbor cells, entails engaging in an E2 setup establishment with a near-real time radio access network (RAN) intelligent controller (near-RT RIC); providing the near-RT RIC with input parameters that the near-RT RIC uses to determine an updated cell reselection priority and sub-priority; receiving from the near-RT RIC a RIC control request with the updated cell reselection priority and sub-priority; and signaling the updated cell reselection priority and sub-priority towards a UE.

Additional aspects and advantages will be apparent from the following detailed description of embodiments, which proceeds with reference to the accompanying drawings.

BRIEF DESCRIPTION OF THE DRAWINGS

To easily identify the discussion of any particular element or act, the most significant digit or digits in a reference number refer to the figure number in which that element is first introduced. In some instances, similar structures or components in the various drawings may retain the same or similar numbering for the convenience of the reader; however, the similarity in numbering does not necessarily mean that the structures or components are identical in size, composition, configuration, or any other property.

FIG. 9, FIG. 10, FIG. 11, FIG. 12, and FIG. 13 are tables illustrating information elements for RIC subscription request for subscribing to reporting CPU and memory utilization.

FIG. 14 is a table illustrating information elements for RIC subscription response for subscribing to reporting CPU and memory utilization.

FIG. 15, FIG. 16, and FIG. 17 are tables illustrating information elements for RIC indication to report CPU and memory utilization.

DETAILED DESCRIPTION OF EMBODIMENTS

Figure 1:
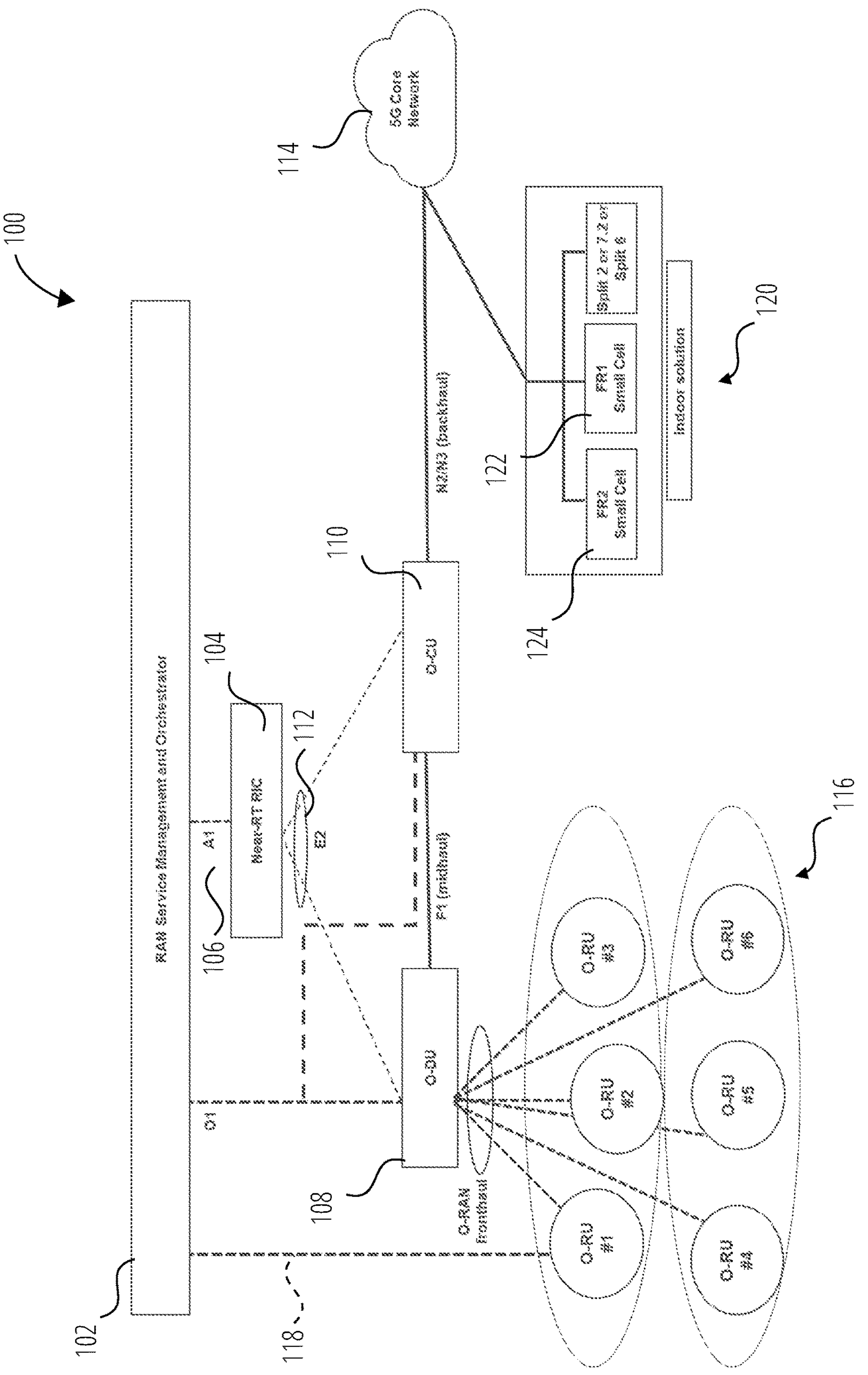
FIG. 1 is an annotated block diagram of an O-RAN architecture, according to some embodiments.

O-RAN architecture promotes openness, interoperability, and flexibility through standardized interfaces and modular components. In O-RAN systems, open interfaces are used for communication between components (e.g., between an O-RAN radio unit (O-RU) and an O-RAN distributed unit (O-DU), between the O-DU and an O-RAN central unit (O-CU)). Communication protocols for these open interfaces may be publicly defined, in contrast to proprietary interfaces, to enable components from a variety of different entities or vendors to seamlessly interact.

Components of O-RAN systems may be disaggregated into modular units. Accordingly, O-RAN architectures support network slicing, which enables operators to create isolated segments of the network optimized for specific use cases or service types, enhancing the efficiency and flexibility of service delivery.

O-RAN architectures may include one or more O-RUs, one or more O-DUs, and an O-CU. An O-RU transmits and receives radio signals to and from user devices (e.g., user equipment (UE)). An O-RU converts digital data to be transmitted to user devices to radio signals, and converts radio signals from the user devices to digital data. An O-DU may process radio signals from one or more O-RUs and forward the processed data to a core network. An O-CU may handle higher-level functions (e.g., radio resource management, coordination of one or more O-DUs, and interfacing with the core network).

Cell reselection priority and cell reselection sub-priority may be provided by operations, administration, and maintenance (OAM) or RAN orchestration during cell bring-up procedure. Cell reselection may remain the same until/unless a new value is received from OAM or RAN orchestration in a gNB deployment.

In the case of O-RAN, a near-real-time RAN intelligent controller (near-RT RIC) may be used to determine cell reselection priority and cell reselection sub-priority while it is being sent an RRC release message toward a user equipment (UE). In O-RAN, however, there is no defined mechanism for determining dynamic cell reselection priority and cell reselection sub-priority within SIBs for intra-frequency, inter-frequency, and inter-RAT neighbor.

In legacy RAN networks, cell reselection priority and sub-priority are configured by the OAM before the cell is activated for radiated transmission. For example, an operator may perform static allocation of cell reselection priority and sub-priority based on a hierarchical configuration of the various frequency bands supported in a given geographical region. The dynamics of an end user mobility pattern may change which may result in static allocation of cell reselection priority and sub-priority being relatively inefficient.

As no dynamic cell reselection priority and cell reselection sub-priority determination is supported in O-RAN, a UE may reselect to a carrier frequency having higher cell reselection priority. In general deployment, reselection toward a cell having higher reselection priority and cell reselection sub-priority is given priority by configuring cell reselection parameters accordingly in SIBs (SIB2, SIB3, SIB4, SIB5). For reselection, a UE may give priority to a cell having higher cell reselection priority and cell reselection priority even when the cell is more overloaded than another cell having a lower cell reselection priority and cell reselection sub-priority, which may not be overloaded. After reselecting to the cell when the UE moves to connected states, the UE may see a connection rejection of its request, or other UE resources may be preempted in order to admit current UE, whereas the other cell may have resources that remain under-utilized due to lower cell reselection priority and cell reselection sub-priority. Accordingly, a relatively poor user experience along with under-utilization of resources results, which in turn results in revenue loss.

In some embodiments, an O-RAN system may include dynamic evaluation and modification of cell reselection priority and cell reselection sub-priority, which may improve RAN performance as compared to O-RAN systems that use fixed cell reselection priority and cell reselection sub-priority.

FIG. 1 illustrates that O-RAN architecture 100 includes a RAN service management and orchestrator (SMO) 102, which may oversee provisioning, deployment, and lifecycle management of RAN services (e.g., configure radio resources, set up network slices, ensure that services are delivered according to quality of service (QOS) requirements). SMO 102 may also coordinate and automate allocation of network resources and a configuration of RAN elements to perform functions of different services (e.g., adjust parameters such as bandwidth, frequency, power levels, and beamforming).

O-RAN architecture 100 also includes a near-real-time RAN intelligent controller (near-RT RIC 104) communicatively coupled to SMO 102 via an A1 interface 106. Near-RT RIC 104 may manage radio resources (e.g., spectrum allocation, power control, beamforming). Near-RT RIC 104 may perform various operations to optimize performance of the network including O-RAN architecture 100 based on real-time data and analytics, which may be indicative of conditions and demands on the network. Near-RT RIC 104 may further make real-time adjustments based on traffic load, interference, user mobility, and signal quality, and use predictive analytics to address potential issues before they affect QoS. Near-RT RIC 104 may allocate available radio resources to increase utilization of limited resources and reduce interference and network congestion. Near-RT RIC 104 may adapt resources of the RAN to improve QoS, reduce latency, and improve network efficiency. More detail regarding near-RT RIC 104 is discussed with reference to FIG. 2.

O-RAN architecture 100 also includes O-DU 108 and O-CU 110. O-DU 108 is communicatively coupled to near-RT RIC 104 via an E2 interface 112, and to SMO 102 via an O1 interface. O-CU 110 is communicatively coupled to near-RT RIC 104 via E2 interface 112, to O-DU 108 via an F1 (midhaul) interface, and to SMO 102 and O-DU 108 via an O1 interface. O-DU 108 may handle baseband processing operations (e.g., modulation, coding, signal processing operations, managing connections between UEs and 5G core network 114) for the RAN. O-CU 110 may handle upper layer operations of the RAN (e.g., radio resource control (RRC) management). For example, O-CU 110 may be involved with radio resource scheduling.

O-RAN architecture 100 also includes O-RUs 116 (e.g., O-RU #1, O-RU #2, O-RU #3, O-RU #4, O-RU #5, and O-RU #6 in FIG. 1) communicatively coupled to O-DU 108 via an O-RAN fronthaul interface and to SMO 102 via an open FH M-plane interface 118. O-RUs 116 may be located at cell sites and may handle radio signal modulation of signals to be sent to UEs, demodulation of signals received from UEs, beamforming, and other radio frequency processing. Together, O-CU 110, O-DU 108, and O-RUs 116 operate as a gNB of a 5G network. This modular approach for distributing the gNB between different components may enable easier upgrades, maintenance, and introduction of new services.

O-RAN architecture 100 includes 5G core network 114 communicatively coupled with O-CU 110 via an N2 interface or an N3 interface (backhaul). 5G core network 114 may perform operations related to access and mobility management function (AMF) for user devices, session management function (SMF) for controlling session establishment and management, handling of user plane function (UPF) for data forwarding and packet processing, management of unified data management (UDM) for subscriber data and authentication, provision of authentication server function (AUSF), and network slice selection function (NSSF) for selecting appropriate network slices for various services.

O-RAN architecture 100 further includes indoor solution 120 including a frequency 1 small cell 122 (FR1 small cell 122), and a frequency 2 small cell 124 (FR2 small cell 124), which may serve as low-powered cellular base stations (e.g., in indoor environments). FR1 small cell 122 may operate in frequency bands less than 6 GHZ, whereas FR2 small cell 124 may operate at frequency bands greater than 24 GHZ. Although FIG. 1 shows small cells and an indoor solution, the techniques described in this disclosure are also applicable for outdoor and macro cell deployments.

The base stations (e.g., FR1 small cell 122 and FR2 small cell 124) may be implemented using a split 2, split 7.2, or split 6 functional split, which correspond to different functional divisions between a central unit (CU) and a distributed unit (DU). Split 2 specifically may be referred to as "mid-haul transport over Ethernet" because the CU and the DU may communicate with each other via Ethernet-based mid-haul connections. In split 2, the CU is responsible for higher-layer functions (e.g., radio resource management, control plane processing, coordination of the cell) and the DU is responsible for lower-layer processing (e.g., physical layer functions such as modulation, demodulation, and beamforming), along with MAC and RLC functions. Split 6 and split 7.2 are other examples of different distribution implementations.

Figure 2:
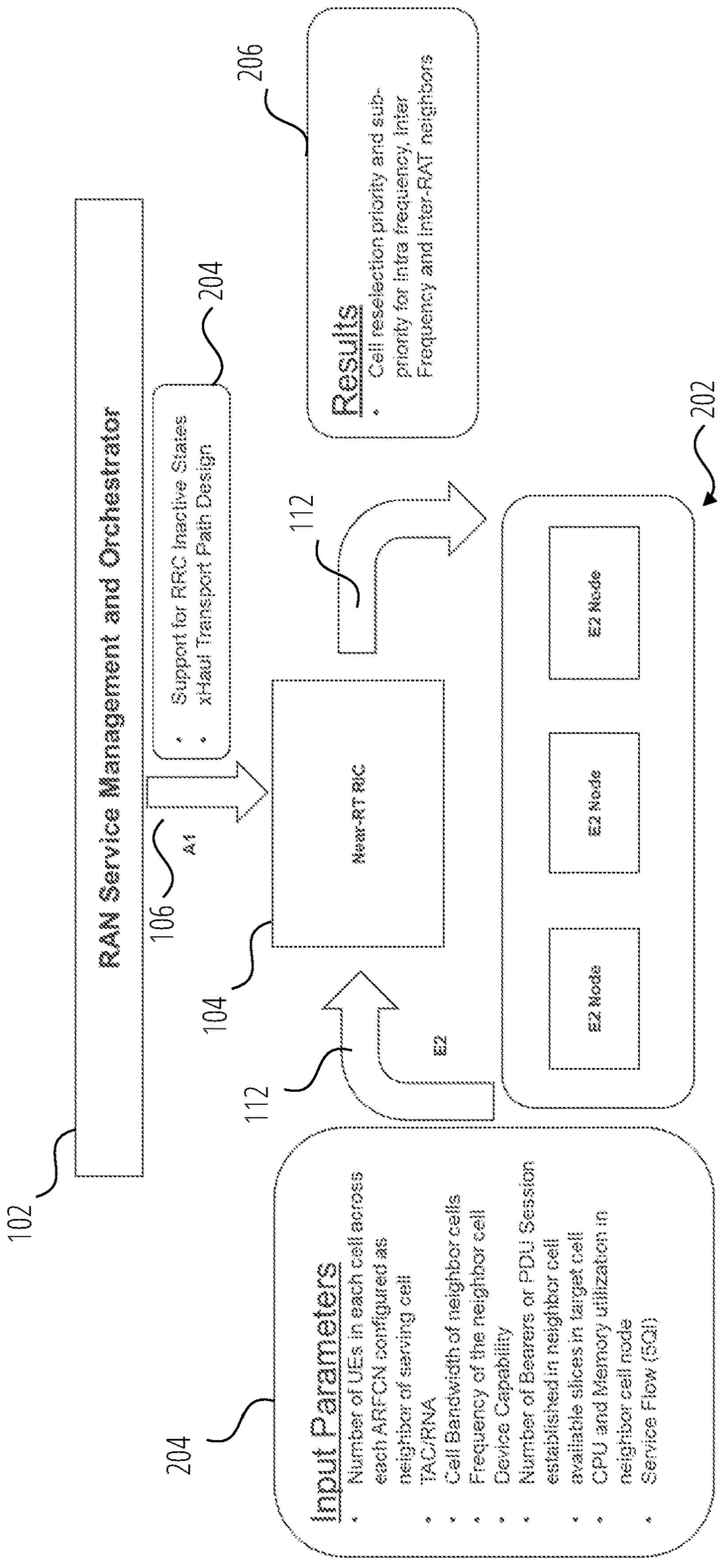
FIG. 2 is an annotated block diagram showing dynamic computation of cell reselection priority and sub-priority at near-RT RIC, according to some embodiments.

FIG. 2 illustrates E2 node 202 (e.g., O-DU 108 and O-CU 110) communicatively coupled with near-RT RIC 104 so that near-RT RIC 104 receives input parameters 204 for dynamic cell reselection. An apparatus (e.g., processor) of near-RT RIC 104 may include a data storage device to store one or more input parameters 204 received via E2 interface 112.

By way of non-limiting examples, input parameters 204 from E2 node 202 may include one or more of the following: a number of user equipment (UE) devices in each cell across each absolute radio frequency channel number (ARFCN) configured as a neighbor of a serving cell; a tracking area code (TAC) and a RAN notification area (RNA); cell bandwidths of neighbor cells; frequencies of neighbor cells; device capabilities; a number of bearers or packet data unit (PDU) session established in a neighbor cell; available slices in a target cell; central processing unit (CPU) and memory utilization in a neighbor cell node; or a service flow parameter (e.g., a 5G quality of service (QOS) indicator (5QI)). Examples are described as follows.

Number of UEs in each cell across each ARFCN configured as neighbor of serving cell: For different types of reselection, different types of SIBs are used, such as SIB2 including common cell reselection information common for intra-frequency, inter-frequency and/or inter-RAT cell reselection as well as intra-frequency cell reselection information other than neighboring cell related. SIB3 includes neighboring cell related information relevant for intra-frequency cell reselection. SIB4 includes information relevant for inter-frequency cell reselection, which may also be used for NR idle/inactive measurements. SIB5 includes information relevant for inter-RAT cell reselection, i.e., information about E-UTRA frequencies and neighboring cells relevant for cell reselection. Near-RT RIC 104 may request each of the configured cells across each ARFCN, which are being broadcasted in SIBs, and will be used for cell reselection to report via RIC indication in case that there are changes in UE information (e.g., new UE admitted, any UE released, any UE handed over, or UE ID changed) towards near-RT RIC 104. At first stage, near-RT RIC 104 defines criteria and action definition for UE information change in a RIC subscription procedure towards O-CU 110 (FIG. 1) and is responsive to a defined condition being met, then RIC indication is sent by O-CU 110 to near-RT RIC 104. Near-RT RIC 104 instructs O-CU 110 to report current SIB messages, which are being broadcasted, and neighbor relation table (NRT) details in a RIC subscription. O-CU 110 reports this information in a RIC indication. If there are any changes in SIB content or NRT information, then O-CU 110 also triggers RIC indication to near-RT RIC 104 to inform near-RT RIC 104 of the changes. By using this information, near-RT RIC 104 may determine how many UEs are connected across each neighboring cell and current load condition in each of these cells. Near-RT RIC 104 may rank the cells as per load condition. The neighbor cell having the lightest load may be configured with the highest cell reselection priority and sub-priority, without limitation. If a UE attempts to access services after reselection and a maximum threshold of UEs is already reached, then requested services may be rejected, which may result in a bad user experience. Accordingly, this approach may eliminate or reduce such conditions. Near-RT RIC 104 may determine cell reselection priority and sub-priority in real time based on load condition, which helps in balancing the load across the various cells while providing enhanced user experience as in the case of a UE attempting to access services after a move to a cell with minimal load. In this case, the UE may access services with fewer interruptions (e.g., no interruptions). Once cell reselection priority and sub-priority arc determined, near-RT RIC 104 may use a RIC control procedure to communicate modified cell reselection priority and sub-priority, which may be broadcasted in SIBs to O-CU 110. O-CU 110 may use received cell reselection priority and sub-priority received from near-RT RIC 104 to update SIBs and send updated SIBs in a gNB CU configuration update to O-DU 108 (FIG. 1). O-DU 108 may respond with a gNB CU configuration update acknowledgement to O-CU 110 and start scheduling updated SIBs over an air interface. This input parameter (number of UEs in each cell across each ARFCN configuration as neighbor of serving cell) for determining cell reselection priority and sub-priority may also be communicated to individual UEs in RRC release messages. These RRC release messages may indicate the ARFCN and the corresponding cell reselection priority and sub-priority when a UE moves to an RRC idle/inactive state.

Same TAC/RNA should be prioritized for reselection: Among the configured cells being configured for reselection in SIB3, SIB4, and SIB5, near-RT RIC 104 may filter out cells having a same tracking area code (TAC) and RAN notification area code (RANAC) and prioritize accordingly. The cells having the same TAC and RANAC as a current cell may be categorized into one group having a highest priority. The cells having the same TAC and different RANAC as the current cell may be categorized into one group having a second highest priority, the cells having different TAC and the same RANAC as the current cell may be categorized into one group having a third highest priority, and the cells having different TAC and different RANAC as the current cell may be categorized into one group having a fourth highest priority. Near-RT RIC 104 may configure O-CU 110 to report cell context related information to near-RT RIC 104 in a RIC subscription procedure across the configured neighbor cells and O-CU 110 may report configured TAC and RANAC in a RIC indication message. Near-RT RIC 104 may also instruct O-CU 110 to report current SIB messages, which are broadcasted, and neighbor relation table (NRT) details in a RIC subscription. O-CU 110 may report this information in a RIC indication. If there are any changes in SIB content or NRT information, then O-CU 110 may also trigger a RIC indication toward near-RT RIC 104 to inform near-RT RIC 104 of the changes. Based on received TAC and RANAC values, cell reselection priority and sub-priority in neighbor cells broadcasted in SIBs may be determined. The cells categorized with highest priority may have a highest reselection priority and sub-priority. Cell reselection priority and sub-priority may be decreased according to the priority category the cells belong to, based on the above-discussed classification. Once cell reselection priority and sub-priority are determined, near-RT RIC 104 may use a RIC control procedure to communicate modified cell reselection priority and sub-priority, which is broadcasted in SIBs to O-CU 110. O-CU 110 may use received cell reselection priority and sub-priority from near-RT RIC 104 to update SIBs and send updated SIBs in a gNB CU configuration update towards O-DU 108. O-DU 108 may respond with a gNB CU configuration update acknowledgement toward O-CU 110 and start scheduling updated SIBs over an air interface. Doing so may reduce signaling load once a UE reselects to a neighbor cell. In case of the same TAC and RANAC, the UE may not trigger any signaling message towards a target cell after cell reselection. If the UE is in idle mode and cell reselection is triggered toward a cell having different TAC, however, then after cell reselection the UE may trigger mobility registration procedure toward an access and mobility management function (AMF) to update TAC. Similarly, if a UE is in RRC inactive state and the UE reselects to a cell having a different RANAC, then the UE may trigger an RRC resume procedure with RAN update. According to various embodiments disclosed herein including cell reselection priority and sub-priority based, at least in part, on a same TAC/RNA being prioritized for reselection, signaling load after reselection may be reduced and UE battery usage may be reduced since the UE may not switch between different RRC states. This criterion for determining cell reselection priority and sub-priority may also be communicated to individual UEs in RRC release messages indicating the ARFCN and their cell reselection priority and sub-priority when UEs move to RRC idle/inactive states.

Cell bandwidth of neighbor cells: Different bandwidths may be used in different frequency ranges. FR1 frequencies may support bandwidth sizes such as 5, 10, 15, 20, 25, 30, 35, 40, 45, 50, 60, 70, 80, 90, or 100 MHz and FR2 frequencies may support bandwidth sizes such as 50, 100, 200, or 400 MHZ. In later versions of technical specifications governing these communications, higher bandwidths of 800, 1800, or 2000 MHz may be supported with higher subcarrier spacing (SCS) of 480 and 960 kHz. A cell having a higher bandwidth size may have more resources to serve a higher number of UEs than a small channel bandwidth. Accordingly, configured cells may be sorted according to supported bandwidth sizes. Cells having higher bandwidth sizes may be assigned with higher reselection priority and sub-priority. Near-RT RIC 104 may configure O-CU 110 to report cell context related information to near-RT RIC 104 in a RIC subscription procedure across configured neighbor cells. O-CU 110 may report configured uplink (UL) transmission bandwidth and downlink (DL) transmission bandwidth for frequency division duplexing (FDD) frequencies or transmission bandwidth in case TDD frequencies in a RIC indication message. Near-RT RIC 104 may also instruct O-CU 110 to report current SIB messages, which are broadcasted, and neighbor relation table (NRT) details in a RIC subscription. O-CU 110 may report this information in a RIC indication. In instances where there are changes in SIB content or NRT information, then O-CU 110 may also trigger a RIC indication toward near-RT RIC 104 to inform near-RT RIC 104 of the changes. Once cell reselection priority and sub-priority are determined, near-RT RIC 104 may use a RIC control procedure to communicate modified cell reselection priority and sub-priority, which may be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. Intelligently assigning cell reselection priority and sub-priority by taking cell bandwidth into consideration may generally distribute traffic across cells as per their capacity. These criteria for determining cell reselection priority and sub-priority may also be communicated to individual UEs in RRC release messages indicating the ARFCN and the corresponding cell reselection priority and sub-priority when UEs move to RRC idle/inactive state.

Frequency of the neighbor cells: In NR, the frequency of communications in neighbor cells may be in a range of 410 MHz to 7125 MHz for FR1 or a range of 24250 MHZ to 71000 MHz for FR2. The cells having higher frequencies may have smaller cell sizes and the cells having lower frequencies may have larger cell sizes due to properties of channel propagation. If the UE reselects to a cell having higher frequency, then the UE may trigger reselection more often than if the UE reselects to a cell having lower frequency. Near-RT RIC 104 may configure O-CU 110 to report cell context related information to near-RT RIC 104 in a RIC subscription procedure across configured neighbor cells. O-CU 110 may report configured UL frequency information and DL frequency information for FDD frequencies or NR frequency info in case of TDD frequencies in a RIC indication message. Near-RT RIC 104 may also instruct O-CU 110 to report current SIB messages, which are being broadcasted, and NRT details in a RIC subscription. O-CU 110 may report this information in a RIC indication. In case of change in SIB content or NRT information, then O-CU 110 also may trigger a RIC indication to near-RT RIC 104 to inform near-RT RIC 104 of the changes. Based on received frequency information, the cells having lower frequencies may get higher cell reselection priority and sub-priority and higher frequencies may get lower cell reselection priority and sub-priority. Once cell reselection priority and sub-priority are determined, near-RT RIC 104 may use a RIC control procedure to communicate modified cell reselection priority and sub-priority, which are broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. Determining cell reselection priority and sub-priority may reduce a number of reselection requirement for UEs, which in turn may reduce power usage as UEs trigger reselection less frequently. When UEs attempt to access services after reselection, the UEs may transition to cells that serve their operational demands. This input parameter (frequency of the neighbor cells) for determining cell reselection priority and sub-priority may also be communicated to individual UEs in RRC release messages indicating the ARFCN and the corresponding cell reselection priority and sub-priority when UEs moves to RRC idle/inactive state.

Device capability: In some scenarios, UE capability of UEs registered to a current cell may be taken into consideration while determining the cell reselection priority and sub-priority. For example, if a UE is using URLLC or other delay and mission critical services, then the FDD cells may have a higher priority than a TDD cell due to a separate dedicated uplink. If a larger number of UEs connected to the cells are using URLLC or other delay and mission critical services, then FDD cells with the lowest frequency may have the highest cell reselection priority and sub-priority. Near-RT RIC 104 may instruct O-CU 110 to report an RRC message including UE capability information received from UEs during UE registration procedures in a RIC subscription across configured neighbor cells. Once UE capability information is received at O-CU 110, it may trigger a RIC indication to send received RRC Message to near-RT RIC 104. Near-RT RIC 104 may also instruct O-CU 110 to report current SIB messages, which are broadcasted, and NRT details in a RIC subscription. O-CU 110 may report this information in a RIC indication. In case there are any changes in SIB content or NRT information, then O-CU 110 may also trigger a RIC indication to near-RT RIC 104 to inform near-RT RIC 104 of the changes. Once near-RT RIC 104 receives UE capability information, near-RT RIC 104 may decode the received message, which may be received in an octet string, and determine UE capability such as which 3GPP release version the UEs are compatible with, whether the UEs are non-IoT devices or IoT devices, what type of throughput the UEs may support, etc., and store this information in a database. Once a particular device capability exceeds a certain defined threshold in the mentioned cells or types of services the UE is capable of, such as URLLC, where dedicated uplink is used to meet stringent latency standards, then near-RT RIC 104 may trigger a procedure to dynamically compute the cell reselection priority and sub-priority where a cell that supports latency requirement may get a higher priority. Once cell reselection priority and sub-priority are determined, near-RT RIC 104 may use a RIC control procedure to communicate modified cell reselection priority and sub-priority, which may be broadcasted in SIBs to O-CU 110 in a RIC control procedure. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. Dynamically determining cell reselection priority and sub-priority based, at least in part, on device capability may help in selecting appropriate cells for reselection. Accordingly, in a target cell, if a UE attempts to access services, the UE may be able to do so. Device capability may be used for determining cell reselection priority and sub-priority, and may also be communicated to individual UEs in an RRC release message indicating the ARFCN and corresponding reselection priority and sub-priority when a UE moves to an RRC idle/inactive state.

Number of bearers or PDU sessions established in neighbor cells: A number of bearers or PDU sessions established in each of the neighboring cells may be taken into consideration when determining cell reselection priority and sub-priority. In instances where a UE reselects to a cell and attempts to access service after reselection and the cell the UE is reselected to is overloaded with a maximum number of data radio bearers (DRBs), a rejection to access those services may be communicated to the UE. In order to avoid bad user experience (e.g., rejection of services) and service interruption, the cell reselection priority and sub-priority may be determined dynamically based on a number of bearers across each neighboring cell. Near-RT RIC 104 may rank cells from high priority to low priority in order of the cell having the least number of bearers established to a cell having a maximum number of bearers established. Near-RT RIC 104 may configure CU to report any PDU Session Establishment, PDU Session Modification and PDU Session Release across all configured cells in a RIC subscription procedure across all configured neighbor cell. CU may report for every successful PDU Session Establishment, PDU Session Modification and PDU Session Release towards near-RT RIC 104 in a RIC indication. Near-RT RIC 104 also may instruct CU to report current SIB messages which are being broadcasted and NRT details in a RIC subscription and O-CU 110 may report this information in a RIC indication. In instances where there are changes in SIB content or NRT information, O-CU 110 also may trigger a RIC indication to near-RT RIC 104 to inform near-RT RIC 104 of the changes. In some instances, a neighbor cell having the least number of bearers established may not be loaded, so that cell may have the highest cell reselection priority and sub-priority. The neighbor cell that has a maximum number of bearers established may be loaded. That cell may have lowest cell reselection priority and sub-priority. Once cell reselection priority and sub-priority are determined, near-RT RIC 104 may use a RIC control procedure to communicate modified cell reselection priority and sub-priority, which may be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. By determining cell reselection priority and sub-priority based, at least in part, on a number of bearers enabled, an enhanced user experience may result while reducing frequency of service interruption. This input parameter (number of bearers or PDU sessions established in neighbor cells) for determining cell reselection priority and sub-priority may also be communicated to individual UEs in RRC release messages indicating the ARFCN and corresponding cell reselection priority and sub-priority when the UE moves to an RRC idle/inactive state.

Support for RRC inactive state: RRC inactive state is a newly introduced concept in NR where the UE context may be retained at O-CU 110 when the UE moves to an inactive state for faster switching back to an RRC connected state. In RRC inactive state, RAN paging may be triggered instead of core network (CN) paging as with RRC idle mode. UE mobility may be tracked per RAN notification area (RNA) instead of tracking area (TA). During initial deployment, an operator may or may not choose to deploy RRC inactive state across all cells. Instead, a subset of ARFCN may be configured to support RRC inactive or a particular cell type, such as macro cell, may support RRC inactive, and a femto cell may not, or vice versa. Cell reselection may occur in case of both RRC states (i.e., RRC idle and RRC inactive). Responsive to cell reselection in RRC inactive state, the cell a UE should reselect supports RRC inactive state in case a UE attempts to access services in that cell. Accordingly, neighboring cells that support RRC inactive states may generally be classified with a higher (e.g., a highest) cell reselection priority and sub-priority. Those cells without support for RRC inactive may have lower cell reselection priority and sub-priority. Near-RT RIC 104 may use RRC inactive state support as an input parameter for determining cell reselection priority and sub-priority. Near-RT RIC 104 may derive information about support of RRC inactive state in a cell from an SMO (e.g., SMO 102 of FIG. 1) by using a query policy procedure for configured neighbor cells. Near-RT RIC 104 may instruct O-CU 110 to report current SIB messages that are being broadcasted and NRT details in a RIC subscription. O-CU 110 may report this information in a RIC indication. In instances of change in SIB content or NRT information, O-CU 110 also may trigger a RIC indication to near-RT RIC 104 to inform near-RT RIC 104 of the changes. Once cell reselection priority and sub-priority are determined, near-RT RIC 104 may use a RIC control procedure to communicate modified cell reselection priority and sub-priority, which may be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. Selection of cells that support RRC inactive state during RRC inactive mode mobility may contribute to faster resumption of services in RRC inactive state, as defined in technical standards governing NR. This input parameter (support for RRC inactive state) for determining cell reselection priority and sub-priority may also be communicated to individual UEs in RRC release messages indicating the ARFCN and corresponding cell reselection priority and sub-priority when UEs move to RRC idle/inactive state.

Service flow: Service flow as in input parameter may include different types and may be classified based on the real time or non-real time, conversional or non-conversional, and interactive or non-interactive, and based on characteristics such as packet delay budget (PDB), packet error rate, data burst volume, and other characteristics. The following are few examples of such characteristics: best effort data services (non-GBR 5QIs such as 8, 9, etc.); conversational services (GBR 5QIs such as 1, 2); URLLC services (delay critical GBR such as 80, 82 etc.); real time gaming, V2X (GBR 5QIs such as 3); etc. (see, e.g., 3GPP TS 23.501 table 5.7.4-1, section 5.7.4). Near-RT RIC 104 may take type of services supported by each of the neighbor cells while determining cell reselection priority and sub-priority. A neighbor cell that supports a higher number of services may take higher priority than a neighbor cell that supports a lower number of services, which may take lower priority for cell reselection. Near-RT RIC 104 may configure O-CU 110 to report any QoS flow establishment, QoS flow modification, and QoS flow release across all configured cells in a RIC subscription procedure across configured neighbor cells. O-CU 110 may report for every successful QoS flow establishment, QoS flow modification, and QoS flow release to near-RT RIC 104 in a RIC indication. Near-RT RIC 104 also may instruct O-CU 110 to report current SIB messages that are being broadcasted and NRT details in a RIC subscription. O-CU 110 may report this information in a RIC indication. In instances of change in SIB content or NRT information, O-CU 110 also may trigger a RIC indication to near-RT RIC 104 to inform near-RT RIC 104 of the changes. From information received in a RIC indication, near-RT RIC 104 may maintain a list of QoS flow supported in each neighboring cell as mapped information that is created and maintained dynamically. Accordingly, near-RT RIC 104 may obtain information for constructing a list of services supported across each cell. Based, at least in part, on services supported in each neighboring cell, near-RT RIC 104 may derive cell reselection priority and sub-priority. Once cell reselection priority and sub-priority are determined, near-RT RIC 104 may use a RIC control procedure to communicate modified cell reselection priority and sub-priority to be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. By intelligently determining cell reselection priority and sub-priority based, at least in part, on service flow, an enhanced user experience may be provided while reducing service interruption. This input parameter (service flow) for determining cell reselection priority and sub-priority may also be communicated to individual UEs in RRC release messages indicating the ARFCN and corresponding cell reselection priority and sub-priority when UEs move to RRC idle/inactive state.

Served slices vs. available slices in target cell: Network operators may choose to deploy different network slices for different types of usages, such as cMBB, MIOT, MMTC, and others. These services may be available in certain geographical areas or subsets of cells across frequency or across cells belonging to specific frequencies, for example. During reselection in idle or inactive mode, the UE may select a particular neighbor cell among configured neighbor cells that support currently served slices. Near-RT RIC 104 may instruct O-CU 110 to report cell context related information to near-RT RIC 104. This cell context related information may include s-NSSAI detail, current SIB messages that are being broadcasted, and NRT details in a RIC subscription across configured neighbor cells. O-CU 110 may report requested information in a RIC indication to near-RT RIC 104. Once the requested information is received at near-RT RIC 104, near-RT RIC 104 may process received information and rank the neighbor cell according to serving cell slices. The neighbor cells that support the same slices as a current serving cell may be assigned higher priority (e.g., maximum priority). Neighbor cells that support subsets of slices of the serving cell may be assigned intermediate priority. Neighbor cells that do not have single slices matching with the serving cell may be assigned lower priority (e.g., a minimum priority). Neighbor cells that have a higher priority may be configured with higher cell reselection priority and sub-priority. Neighbor cells that have a subset of slices of serving cell may have the next intermediate cell reselection priority and sub-priority. Neighbor cells that do not have any slices matching with the current cell may be assigned lower cell reselection priority and sub-priority. Once cell reselection priority and sub-priority are determined, near-RT RIC 104 may use a RIC control procedure to communicate modified cell reselection priority and sub-priority to be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. This input parameter (served slices vs. available slices in serving cell) for determining cell reselection priority and sub-priority may also be communicated to individual UEs in RRC release messages indicating the ARFCN and corresponding cell reselection priority and sub-priority when UEs move to RRC idle/inactive state. This approach may aid in better configuring slice aware mobility in idle and inactive mode mobility, and UEs may receive desired slice specific services.

Figure 7:
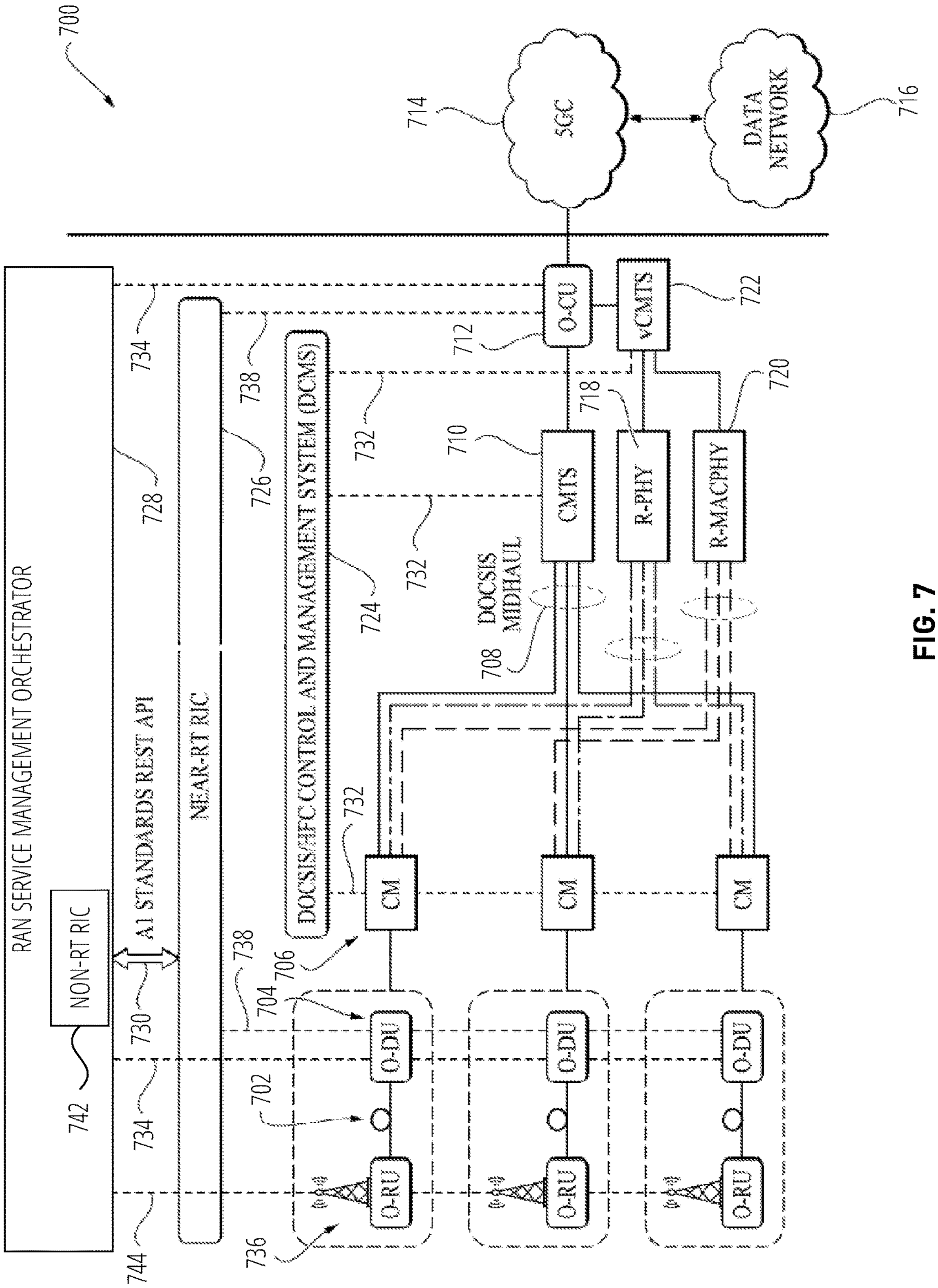
FIG. 7 is a block diagram showing a data over cable service interface specification (DOCSIS) midhaul, according to some embodiments.
Figure 8:
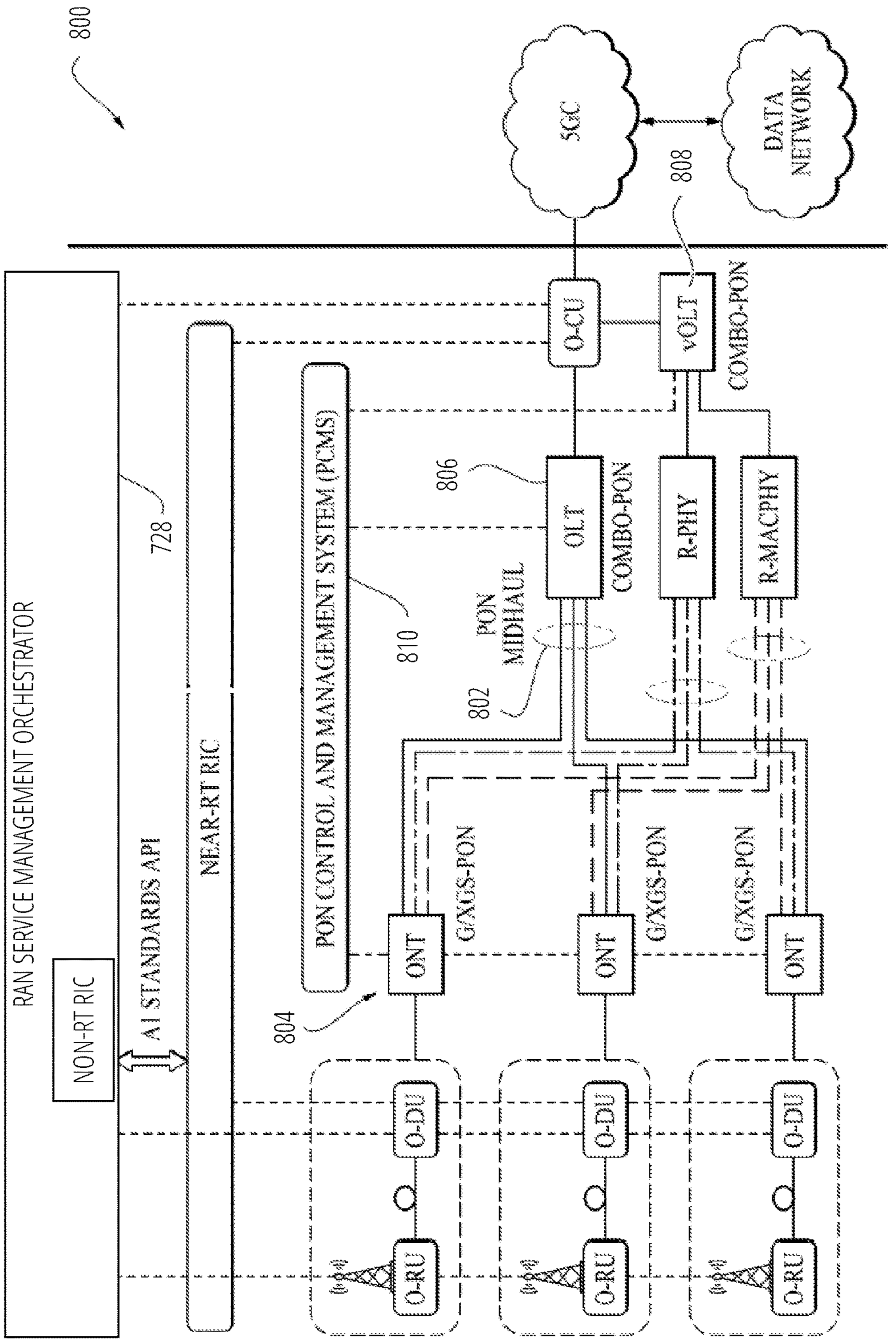
FIG. 8 is a block diagram showing a PON midhaul, according to some embodiments.

In addition to considering changes by taking input parameters 204 from E2 node 202 via E2 interface 112, FIG. 2 also illustrates how near-RT RIC 104 determines cell reselection priority and sub-priority by taking input parameters 204 from SMO 102 via A1 interface 106. For instance, described below are examples of input parameters 204 provided by SMO 102 over A1 interface 106 to near-RT RIC 104.

xHaul transport path design: Different types of transport mechanism designs such as PON, DOCSIS, Microwave, and others may be deployed in fronthaul, midhaul, or backhaul as per service provider specifications. Different types of transport path designs provide different latency, capacity, and reach. While a PON transport path provides lower latency and higher bandwidth but increases capital expenditure (CAPEX), data over cable service interface specification (DOCSIS) provides higher latency and lower bandwidth but reduces CAPEX because it uses existing cable infrastructure. The architecture for different xHaul transport path designs is illustrated in FIG. 7 and FIG. 8 and discussed with reference to FIG. 7 and FIG. 8. While a near-RT RIC 104 (FIG. 1) determines cell reselection priority and sub-priority dynamically at a cell level, the neighbor cells having PON transport path may have higher reselection priority and sub-priority than the neighbor cell having DOCSIS transport path. Similarly, when determining reselection priority and sub-priority on a per UE basis, the UE that has lower latency requirement may be provided with cells to reselect in an RRC release message having latency sensitive transport path design such as PON. UEs that may afford delay may be provided with cells having DOCSIS transport path for reselection in RRC release message. Near-RT RIC 104 obtains information regarding transport path design for each cell by triggering a query policy procedure to SMO 102 (FIG. 1), and SMO 102 may provide details to near-RT RIC 104 in HTTP 200 OK. Once cell reselection priority and sub-priority are determined, near-RT RIC 104 may use a RIC control procedure to communicate modified cell reselection priority and sub-priority to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. This criteria (xHaul transport path design) for determining cell reselection priority and sub-priority may also be communicated to individual UEs in RRC release messages indicating the ARFCN and corresponding cell reselection priority and sub-priority when UEs move to RRC idle/inactive state.

CPU and memory utilization in neighbor cell nodes: Current CPU and memory utilization may be taken into consideration while determining the cell reselection priority and sub-priority of neighbor cells. Neighbor cells where CPU and memory utilization are at their peaks may not be able to serve any new UE reselected to the cells and requesting services. Accordingly, reselection priority may be defined in such a way that the cells where CPU and memory utilization is beyond a specific threshold have lower cell reselection priority and sub-priority. Near-RT RIC 104 may instruct an O-CU currently configured as a neighbor of serving cell O-CU 110 to report CPU and memory utilization when there is a UE admission or release, a bearer addition or release, or report periodically across configured neighbor cells to be used for cell reselection in a RIC subscription procedure. O-CU 110 may report the requested information about CPU and memory utilization in a RIC indication message to near-RT RIC 104. Near-RT RIC 104 may use received information from RIC indication message to determine cell reselection priority and sub-priority. If CPU and memory utilization is beyond certain threshold limits, then cell reselection priority and sub-priority may be reduced in order to make the cell less prioritized for cell reselection. Similarly, in case any of the cells where CPU and memory utilization is low, cell reselection priority and sub-priority may be increased to make the cells more prioritized for cell reselection. Once cell reselection priority and sub-priority are determined, near-RT RIC 104 may use a RIC control procedure to communicate modified cell reselection priority and sub-priority to be broadcasted in SIBs to O-CU 110. O-CU 110 may use received cell reselection priority and sub-priority from near-RT RIC 104 to update SIBs and send updated SIBs in a gNB CU configuration update to O-DU 108. O-DU 108 may respond with a gNB CU configuration update acknowledgement to O-CU 110 and start scheduling updated SIBs over an air interface. This input parameter (CPU and memory utilization in neighbor cell nodes) for determining cell reselection priority and sub-priority may also be communicated to individual UEs in RRC release messages indicating the ARFCN and corresponding cell reselection priority and sub-priority when UEs move to RRC idle/inactive state. Messages including detailed information elements (IEs) are discussed with reference to FIG. 9 to FIG. 17.

Near-RT RIC 104 also includes one or more processors to dynamically determine cell reselection priority for a plurality of O-RUs (e.g., O-RUs 116 of FIG. 1) in a 5G O-RAN system (e.g., having an architecture similar to O-RAN architecture 100 of FIG. 1) responsive to input parameters 204. The one or more processors may also dynamically determine a cell reselection sub-priority responsive to input parameters 204. As a result 206, near-RT RIC 104 may determine cell reselection priority and sub-priority for intra-frequency, inter-frequency, and inter-RAT neighbors.

Example Calculations

As a specific, non-limiting example, near-RT RIC 104 may use the following input parameters 204 to determine cell reselection priority and sub-priority: number of UEs in each cell across each ARFCN configured as the neighbor of serving cell; frequency of the neighbor cell; served slices vs. available slices in target cell; TAC/RNA; cell bandwidth of neighbor cells; and support for RRC inactive state.

For each of these input parameters, a weightage is defined. A range for weightage may be determined as:

$$\text{Base weightage range} = \text{Floor}\,(100/\text{number of input parameters 204 used as inputs}),$$

where "Floor (x)" is the floor operator wherein the input parameter "x" is rounded down to the nearest integer less than or equal to the original input parameter "x," and that nearest integer less than or equal to "x" is provided as output for the floor operator. As per this example, six of input parameters 204 are used. Accordingly, in this example and using the above base weightage range formula, the base weightage for this example is 16. In other words, near-RT RIC 104 may assign a weightage range from 0 to 16, which may be common across parameters. Zero (0) may be the lowest weightage value and 16 may be the highest weightage value in this example. When just one of input parameters 204 is used, the maximum value of the base weightage is 100.

In some instances, near-RT RIC 104 may assign a higher weightage to some of the input parameters than to others. Near-RT RIC 104 may use the below priority weightage formula to assign additional weightage to the input parameters:

$$\text{Priority weightage} = (100 \bmod \text{number of input parameters 204 used as input}) + 28,$$

where "a mod b" is the modulus operator wherein the output of the modulus operator is the remainder when input "a" is divided by input "b," in this case the remainder when the number 100 is divided by the number of input parameters used as inputs. The number 28 is included in the formula because that represents the minimum value for the priority weightage.

As per the above priority weightage formula, in this example the priority weightage is (100 mod 6)+28=32. Additional weightage for priority input parameters may be applied as priority parameter value 32 on the base weightage determined using the base weightage range formula above. Where multiple input parameters are to be prioritized (priority weightage applied thereto), the priority weightage determined using the above priority weightage formula may be distributed equally or unequally, as desired, over some or all of the input parameters.

Where equal distribution of priority weightage is used, the additional weightage that is applied to each prioritized input parameter may be determined as:

$$\text{Priority weightage per prioritized input parameter} = \text{priority weightage/number of prioritized input parameters}$$

For unequal distribution for each parameter, a priority coefficient may be assigned where the range of priority coefficient may be between zero and one, and a sum of the priority coefficient across the prioritized parameters is 1. For example, if two parameters are prioritized, a first one of the parameters may be assigned, by near-RT RIC 104, a priority coefficient of 0.6 and for another input parameter a priority coefficient of 1−. 6=. 4 may be assigned.

With continued reference to the above example, priority may be assigned to two of the input parameters: (1) frequency of the neighbor cell and (2) served slices vs. available slices in the target cell. In some embodiments, a priority weightage value of 32 may be divided equally between these two parameters, i.e., 16 is the additional weightage for each of the two input parameters. The range for weightage of input parameters frequency of the neighbor cell and served slices vs. available slices becomes 16 (base weightage)+16 (priority weightage)=32. Near-RT RIC 104 may assign weightage in a rage of 0 to 32 with 0 being the lowest and 32 being the highest for frequency of the neighbor cell and served slices vs. available slices. In some embodiments that weightage may be distributed unequally between the two input parameters.

Assuming equal priority weightage is assigned to (1) frequency of the neighbor cell and (2) served slices vs. available slices in the target cell, per the above formulae, the maximum weightage for each of the six selected input parameters for this example are as shown below (total for all parameters is 128, i.e., $2^7$):

| | |
|---|---|
| Number of UEs in each cell across each ARFCN configured as neighbor of serving cell | weightage = 16 |
| Frequency of the neighbor cell | weightage = 32 |
| Served slices vs. available slices in target cell | weightage = 32 |
| Same TAC/RNA should be prioritized for reselection | weightage = 16 |
| Cell bandwidth of neighbor cells | weightage = 16 |
| Support for RRC inactive states | weightage = 16 |

Subsequently, near-RT RIC 104 may perform a cell reselection priority and sub-priority operation based on a current cell condition. Near-RT RIC 104 may assign the following values:

| | |
|---|---|
| Number of UEs in each cell across each ARFCN configured as neighbor of serving cell | weightage = 10 |
| Frequency of the neighbor cell | weightage = 22 |
| Served slices vs. available slices in target cell | weightage = 20 |
| Same TAC/RNA should be prioritized for reselection | weightage = 10 |
| Cell bandwidth of neighbor cells | weightage = 6 |
| Support for RRC inactive states | weightage = 12 |

Near-RT RIC 104 may use the formula below to determine the cell reselection priority:

$$\text{Cell Reselestion Priority} = \text{Floor (log2(Min((Weightage for Parameter1 + Weightage for Parameter2} \ldots + \text{Weightage for Parameter}n), 128)))$$

wherein the value 128 is used here because it is $2^7$, seven is the maximum priority, and the log 2 function is used to obtain the exponential value.

Near-RT RIC 104 may use the formula below to determine the cell reselection sub-priority:

$$\text{Cell Reselection Sub-Priority} = \text{Round to nearest value as per specs}[(\text{Min}((\text{Weightage for Parameter1/100} + \text{Weightage for Parameter2/100} \ldots + \text{Weightage for Parameter } n/100), 0.8))],$$

where Min (a, b) is the minimum operator wherein the output is whichever of inputs a and b is less than the other. As per the 3GPP TS 38.331 specification for cell reselection sub-priority, the following values are supported: CellReselectionSubPriority::=ENUMERATED {oDot2, oDot4, oDot6, oDot8}.

For this specific, non-limiting example, near-RT RIC 104 may determine the cell reselection priority and the cell reselection sub-priority as follows:

$$\text{Cell Reselection Priority} = \text{Floor (log2(Min((10 + 22 + 20 + 10 + 6 + 12), 128)))}$$
$$\text{Floor} = \text{(log2(Min(80, 128)))}$$
$$= \text{Floor (log2(80)}$$

-continued $$= \text{Floor}\ (6.322)$$

$$= 6$$

$$\text{Cell Reselection Sub-Priority} = \text{Round to nearest value as per specs}[(\text{Min}((0.10 + 0.22 + 0.20 + 0.10 + 0.06 + 0.12), 0.08))]$$

$$= \text{Round to nearest value as per specs}\ [(\text{Min}\ 0.8, 0.8))]$$

$$= \text{Round to nearest value as per specs}\ [0.8]$$

$$= 8$$

Example Process

Figure 3:
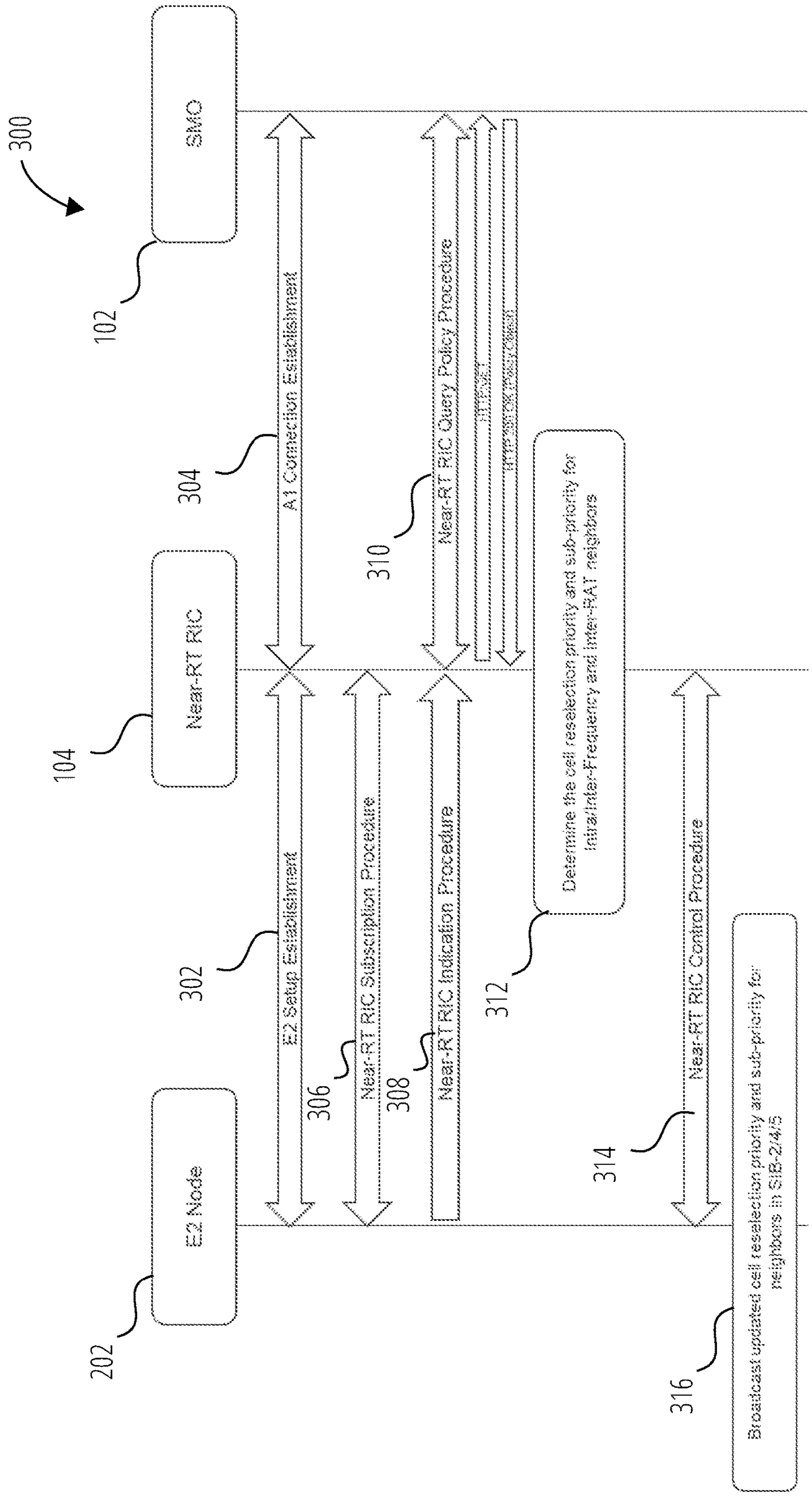
FIG. 3 is a signal flow diagram illustrating a call flow for dynamic determination of cell reselection priority and sub-priority in a near-RT RIC at cell level, according to some embodiments.

Referring now to FIG. 3 (dynamic determination of cell reselection priority and sub-priority at the cell level), the signal flow diagram includes an E2 node 202, near-RT RIC 104, and SMO 102. Initially, at operation 302, call flow 300 entails E2 setup establishment. The E2 setup establishment may be made over an E2 interface. A first E2 setup procedure may be triggered between E2 node 202 and near-RT RIC 104 in order to establish the E2 connection.

After successful E2 connection establishment, at operation 304, call flow 300 includes A1 connection establishment between near-RT RIC 104 and SMO 102.

At operation 306, call flow 300 includes a RIC subscription procedure. Near-RT RIC 104 may subscribe for one or more E2 subscriptions on E2 node 202 including an event trigger and a sequence of actions, each with a corresponding subsequent action. When a defined event trigger condition is met at E2 node 202, E2 node 202 may trigger transmittal of a RIC indication operation 308 with requested information towards near-RT RIC 104. E2 node 202 need not share towards near-RT RIC 104 in a RIC indication the details of cells for which cell reselection is not allowed (e.g., due to any reason such as the cell is barred, or it is a blacklisted cell for idle/inactive mode mobility).

Once near-RT RIC 104 receives input parameters (e.g., input parameters 204 of FIG. 2) from E2 node 202, near-RT RIC 104 queries policy procedure at operation 310 (between near-RT RIC 104 and SMO 102). In query policy procedure, near-RT RIC 104 sends HTTP/GET to SMO 102 to query information about the above-mentioned procedure. SMO 102 responds with requested information in HTTP 200 OK containing the requested policy object.

Near-RT RIC 104 may, at operation 312, take these input parameters as input and determine cell reselection priority and sub-priority for intra-frequency, inter-frequency and inter-RAT neighbors. Near-RT RIC 104 may take one or more parameters from either E2 node 202, SMO 102 or both as an input and determine cell reselection priority and sub-priority (e.g., at operation 312). This approach may create a closed-loop association between E2 node 202 and near-RT RIC 104 while determining cell reselection priority (e.g., at operation 312).

At operation 314, call flow 300 includes a RIC control procedure, during which a determined cell reselection priority and sub-priority are provided, by near-RT RIC 104, to E2 node 202 in a RIC control request. If the provided information is successfully processed at E2 node 202, then E2 node 202 may respond to near-RT RIC 104 by transmitting a RIC control acknowledge message to near-RT RIC 104.

If the cell reselection priority and sub-priority information is received at the cell level, then E2 node 202 (e.g., O-CU 110) updates the cell reselection priority in SIB2, SIB4, and/or SIB5. Accordingly, at operation 316, call flow 300 includes broadcasting updated cell reselection priority and sub-priority for neighbors in SIB2/4/5. If cell reselection priority and sub-priority is received for intra-frequency neighbor, then SIB2 may be updated. If information is received for an inter-frequency neighbor, then SIB4 may be updated and inter-RAT neighbor SIB5 may be updated. If the received cell reselection priority and sub-priority value at E2 node 202 is the same as the value currently being broadcasted in some or all of the SIBs, then those SIBs will continue to use earlier values of cell reselection priority and sub-priority.

The one or more of E2 node 202 responds to near-RT RIC 104 with a RIC control acknowledge message responsive to successful processing of the cell reselection priority and sub-priority received in the RIC control request.

As discussed above, near-RT RIC 104 uses one or more of input parameters 204 from either E2 node 202, SMO 102, or both as input/inputs and determines cell reselection priority and sub-priority. This approach creates a closed-loop association between E2 node 202 and near-RT RIC 104 while determining cell reselection priority.

Figure 4:
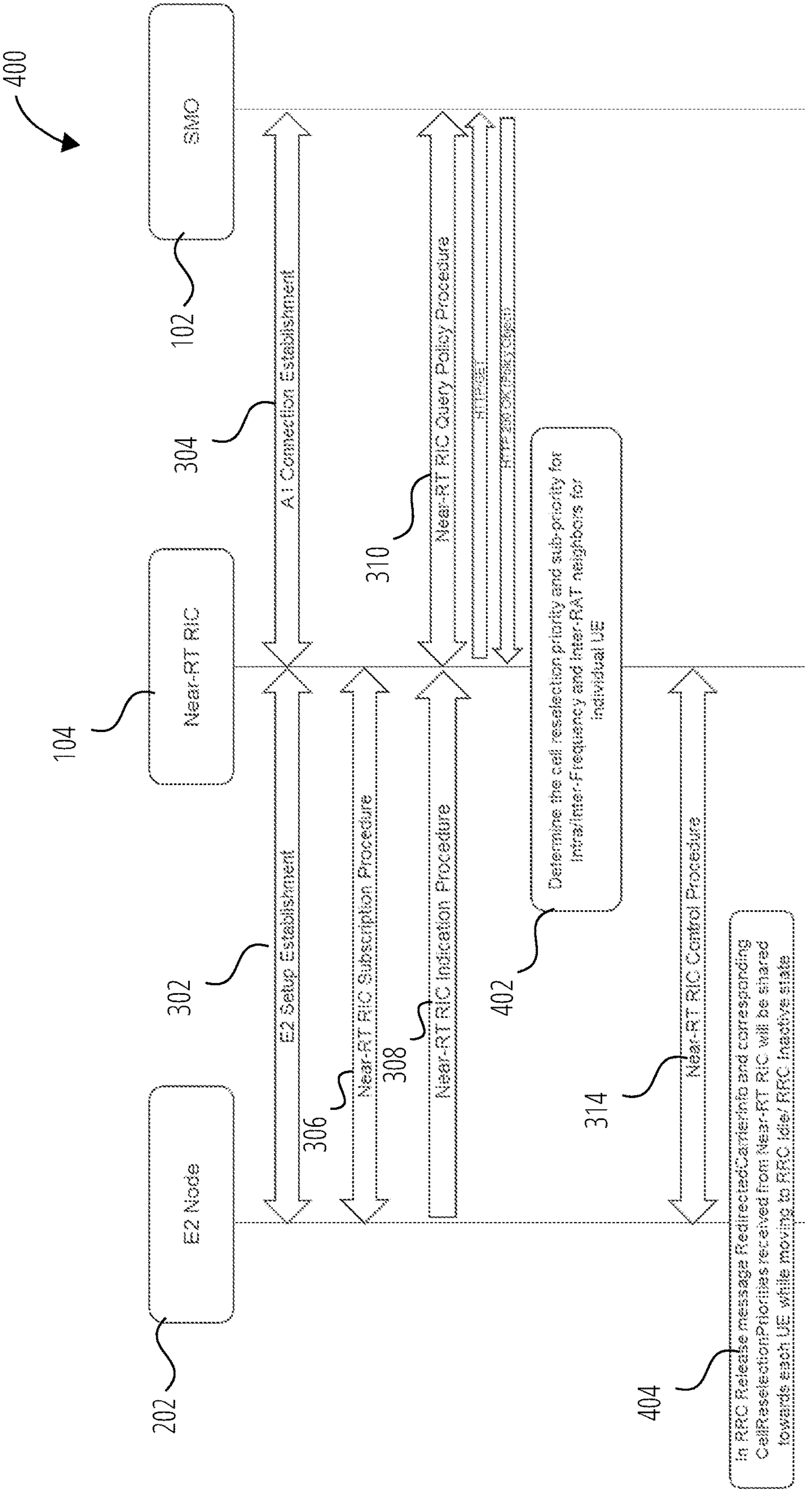
FIG. 4 is a signal flow diagram illustrating a call flow for dynamic determination of cell reselection priority and sub-priority in a near-RT RIC at UE level, according to some embodiments.

Call flow 400 of FIG. 4 (dynamic determination of cell reselection priority and sub-priority at the UE level) is similar to call flow 300 of FIG. 3. For example, FIG. 4 illustrates E2 node 202, near-RT RIC 104, and SMO 102. Also, call flow 400 includes operation 302, operation 304, operation 306, operation 308, and operation 310, which are discussed above with reference to FIG. 3.

In place of operation 312 of FIG. 3 (determine the cell reselection priority and sub-priority for intra/inter-frequency and inter-RAT neighbors), however, call flow 400 includes operation 402, determine the cell reselection priority and sub-priority for intra/inter-frequency and inter-RAT neighbors for individual UEs. Also, in place of operation 316 of FIG. 3 (broadcast updated cell reselection priority and sub-priority for neighbors in SIB2/4/5), call flow 400 includes operation 404, in RRC release message RedirectedCarrierInfo and corresponding CellReselectionPriorities received from near-RT RIC 104 will be shared towards each UE while moving to RRC idle/RRC inactive state. Accordingly, if the cell reselection priority and sub-priority information are received per UE level, then in an RRC release message RedirectedCarrierInfo and corresponding CellReselectionPriorities messages received from near-RT RIC 104 may be shared to each UE while moving to RRC idle/RRC inactive state. If the received cell reselection priority and sub-priority value at E2 node 202 is the same as the value currently available for RRC release message, then E2 node 202 will continue to use earlier stored values of cell reselection priority and sub-priority.

Figure 5:
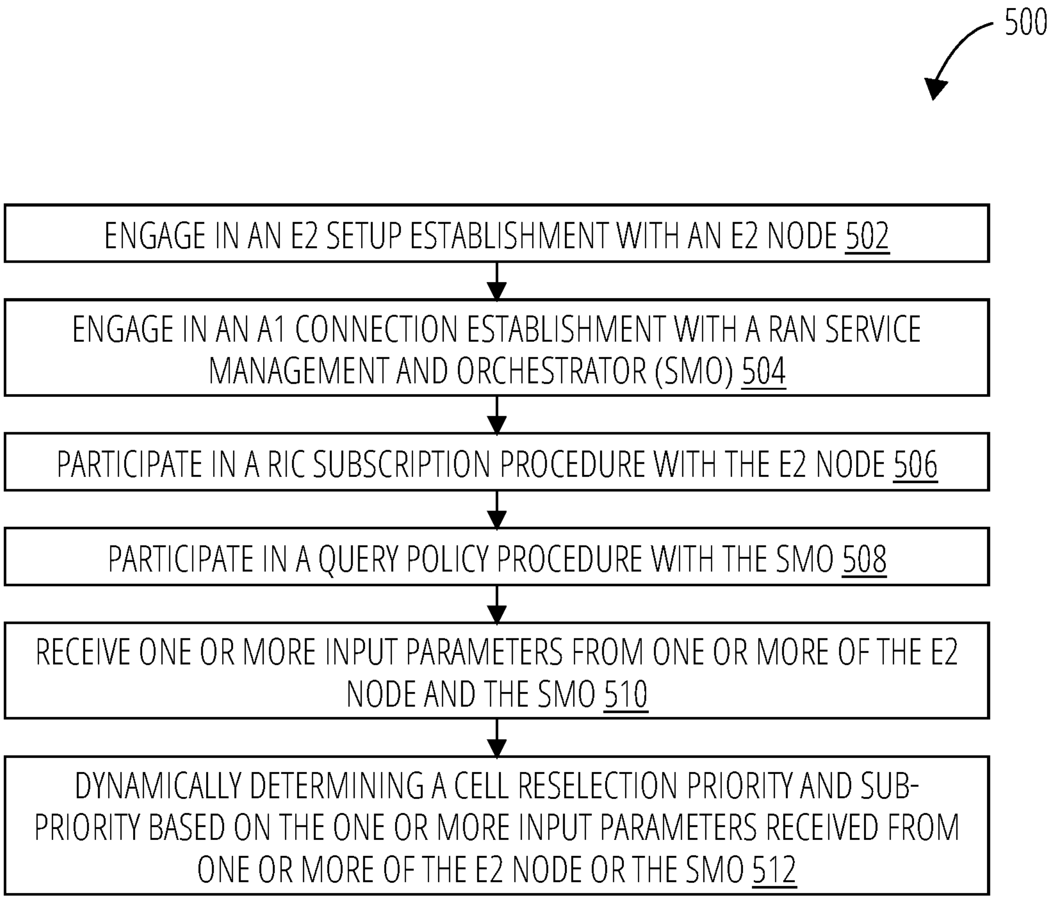
FIG. 5 is a flow chart of a process, performed by a near-RT RIC, of changing a cell reselection priority and sub-priority for intra-frequency neighbor cells, inter-frequency neighbor cells, or inter-RAT neighbor cells in accordance with one embodiment.

FIG. 5 shows a process 500, performed by near-RT RIC 104, of changing a cell reselection priority and sub-priority for intra-frequency neighbor cells, inter-frequency neighbor cells, or inter-RAT neighbor cells. In block 502, process 500 engages in an E2 setup establishment with an E2 node. In block 504, process 500 engages in an A1 connection establishment with a RAN service management and orchestrator (SMO). In block 506, process 500 participates in a RIC subscription procedure with the E2 node. In block 508, process 500 participates in a query policy procedure with the SMO. In block 510, process 500 receives one or more input parameters from one or more of the E2 node and the SMO. In block 512, process 500 dynamically determines a cell reselection priority and sub-priority based on the one or more input parameters received from one or more of the E2 node or the SMO.

Process 500 may also include triggering a RIC control procedure with the E2 node to cause it to broadcast an updated SIB2/4/5 with the cell reselection priority and sub-priority.

Process 500 may also include triggering a RIC control procedure with the E2 node to cause it to generate an RRC release message with the cell reselection priority and sub-priority for a UE moving to an RRC idle or inactive state.

Figure 6:
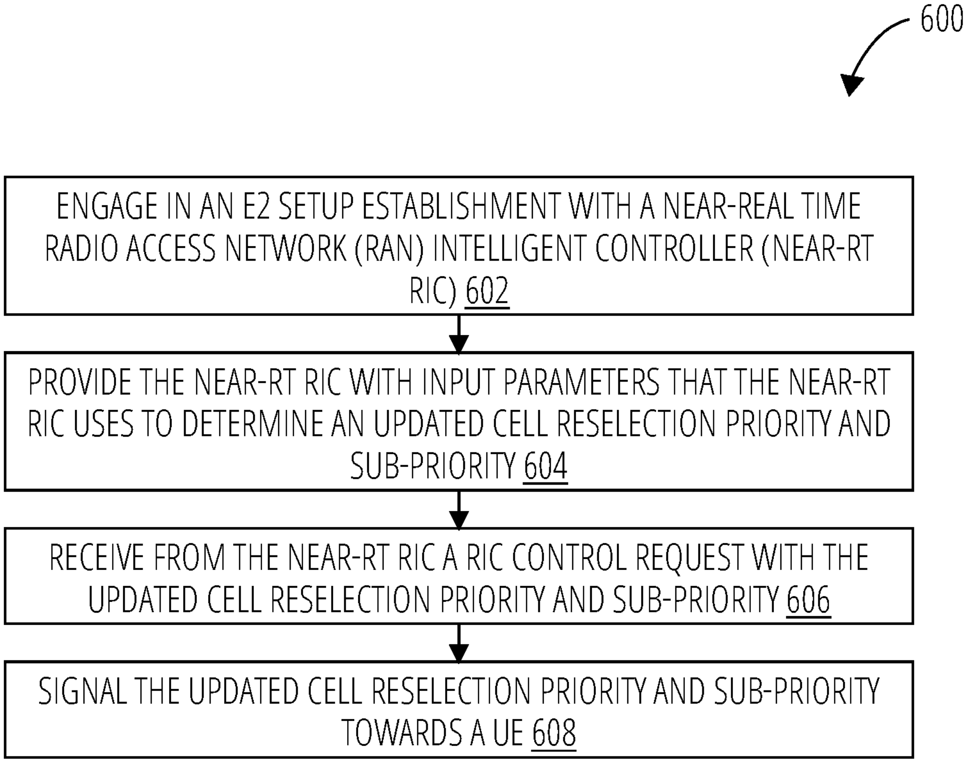
FIG. 6 is a flow chart of a process, performed by an E2 node, of changing a cell reselection priority and sub-priority for intra-frequency neighbor cells, inter-frequency neighbor cells, or inter-RAT neighbor cells in accordance with one embodiment.

FIG. 6 shows a process 600, performed by E2 node 202, of changing a cell reselection priority and sub-priority for intra-frequency neighbor cells, inter-frequency neighbor cells, or inter-RAT neighbor cells. In block 602, process 600 engages in an E2 setup establishment with a near-real time radio access network (RAN) intelligent controller (near-RT RIC). In block 604, process 600 provides the near-RT RIC with input parameters that the near-RT RIC uses to determine an updated cell reselection priority and sub-priority. In block 606, process 600 receives from the near-RT RIC a RIC control request with the updated cell reselection priority and sub-priority. In block 608, process 600 signals the updated cell reselection priority and sub-priority towards a UE.

Process 600 may also include signaling the updated cell reselection priority and sub-priority at the cell level by broadcasting a SIB.

Process 600 may also include signaling the updated cell reselection priority and sub-priority at the UE level using an RRC release message.

FIG. 7 shows an example of an HFC transport network 700 combining both fiber-optic and DOCSIS coaxial cable technologies. This type of network is commonly used by cable TV and internet service providers to deliver broadband services to residential and commercial customers. In an HFC network, high-speed fiber-optic cables carry data from the provider's central office to local distribution nodes in neighborhoods or communities. From these nodes, coaxial cables are used to connect individual homes and businesses. The fiber-optic portion of the network is capable of supporting high data transmission rates over long distances with minimal signal loss, while the coaxial cable portion provides a cost-effective means of connecting individual subscribers within the last mile of the network. HFC networks provide a balance between the performance benefits of fiber-optic technology and the lower deployment costs associated with coaxial cables. However, they may face limitations in terms of higher symmetrical gigabit-per-second bandwidths (e.g., simultaneous transmission of 10 Gbps or higher in downstream and upstream) and signal quality compared to networks that are entirely fiber-based (e.g., XGS-PON and their evolution to higher speeds such as 25 Gbps/50 Gbps PON). As demand for higher-speed internet services continues to grow, some providers are upgrading their networks to FTTH or FTTP architectures, which replace the coaxial portion of the HFC network with fiber-optic connections directly to homes and businesses.

In the example of FIG. 7, each O-RU has an open fronthaul 702 with a corresponding O-DU 704. Each O-DU 704 connects to a corresponding CM 706 that provides a DOCSIS midhaul 708 with a CMTS 710. An O-CU 712 provides a connection to a 5GC 714 and a DN 716.

A remote PHY (R-PHY) device (RPD) (shown as R-PHY 718 in FIG. 7), a remote MAC and PHY (R-MACPHY) device (RMD) (shown as R-MACPHY 720 in FIG. 7), and a virtual CMTS (vCMTS) 722 are related to cable access network architecture, specifically DOCSIS midhaul 708, which is used to provide high-speed broadband services over HFC transport network 700. These technologies are part of the evolution of cable network infrastructure towards a more distributed and virtualized architecture, aiming to improve efficiency, scalability, and performance, helping cable operators adapt to the increasing demand for high-speed broadband services. They also enable operators to better compete with other broadband technologies, such as FTTH, FTTP, and 5G wireless networks.

R-PHY is a technology that moves the physical layer of the cable access network from the traditional centralized headend to a remote location closer to the customer, typically at the fiber node. This separation allows for increased network capacity, faster signal processing, reduced latency, and improved signal quality. In an R-PHY architecture, a CMTS or converged cable access platform (CCAP) core remains in the central office, while the physical layer processing is offloaded to R-PHY 718 in the field.

R-MACPHY takes the distributed architecture a step further by moving both the physical layer (PHY) and the media access control layer (MAC) of the cable access network to a remote location. In this configuration, the CMTS or CCAP core in the central office is reduced to a virtualized control plane function, while the MAC and PHY processing are offloaded to R-MACPHY 720 in the field. This approach may lead to enhanced scheduling, call admission control, and even greater scalability, efficiency, and performance improvements compared to R-PHY 718.

Virtual CMTS is a technology that virtualizes the CMTS or CCAP functionality, enabling it to run on standard off-the-shelf hardware, such as servers, rather than dedicated proprietary equipment. By leveraging virtualization and cloud computing technologies, vCMTS 722 may improve network agility, scalability, and cost-efficiency. As shown in FIG. 7, vCMTS 722 is optionally combined with R-PHY 718 or R-MACPHY 720 distributed architectures to further optimize the cable access network.

With the implementation of DOCSIS midhaul 708, a DOCSIS/HFC control and management system (DCMS) 724 is provided. DCMS 724 is a containerized software platform that allows cable operators to manage, monitor, and control their HFC networks and DOCSIS infrastructure. For instance, DCMS 724 helps cable operators maintain and optimize their network performance, ensuring reliable and efficient service delivery to subscribers. As networks evolve with the adoption of technologies like R-PHY, R-MACPHY, and virtualization, DCMS 724 also adapts to support these advancements and maintain efficient network management. It typically includes a suite of tools and features that facilitate the management tasks, as follows. Network Configuration: DCMS 724 provides tools for configuring and managing network elements such as CMTS 710, CCAP, R-PHY 718, and R-MACPHY 720. This includes setting up IP addresses, allocating bandwidth, and defining service profiles. Device Provisioning: DCMS 724 is responsible for provisioning customer devices, such as cable modems and set-top boxes, to enable them to access the network and receive services. This entails assigning configuration files, registering devices, and managing subscriber authentication. Fault Management: DCMS 724 helps cable operators detect, diagnose, and resolve network issues by monitoring the performance of network elements and providing alarms or notifications in case of faults or outages. Performance Monitoring: DCMS 724 collects and analyzes network performance data, such as signal levels, noise levels, and bandwidth utilization, to help operators identify potential issues, optimize network capacity, and improve service quality. Security Management: 724 enforces security policies and manages access control for the network infrastructure, ensuring the integrity and confidentiality of data transmitted over the HFC transport network 700. Reporting and Analytics: DCMS 724 generates various reports and analytics to help cable operators make data-driven decisions related to network planning, capacity management, and service quality improvements.

FIG. 7 also shows near-RT RIC 726. As described previously, near-RT RIC 726 provides for control of O-DUs, including O-DU 704. Each O-DU 704 connects to a CM 706 and CMTS 710 via the midhaul HFC transport architecture to transfer the bidirectional digital baseband data to/from O-CU 712. O-CU 712 aggregates O-DU 704 functions and a ratio of O-DU to O-CU depends on the operator network traffic dimensioning in a given geographical location. The traffic loading of the midhaul HFC transport network may impact the number of connected 5G users that may actively engage in end-to-end high-speed data transfers besides other conversational services.

FIG. 7 also shows an SMO 728 and a non-RT RIC 742. Non-RT RIC 742 includes communication to near-RT RIC 726 over an A1 interface 730 using a REST API. SMO 728 works across the spectrum of broadband access technologies and interacts via standards-based APIs to synthesize the data-driven intelligence and generate dynamic triggers to switch the traffic across transport network options that exist in a given location. Bidirectional traffic may be split across transport paths based on the learning processes and network traffic patterns over time. This helps them to instantiate dynamic network slicing instantiation/modification/de-instantiation on demand and manage via SMO 728.

FIG. 7 also represents with dashed lines a data exchange 732 for collecting information concerning faults, configuration and performance monitoring information associated with CMTS 710 and vCMTS 722 towards DCMS 724. Other dashed lines represent a data exchange 734 (e.g., over an O1 interface or management plane) of operations, administration, and maintenance (OAM) information and other management information between O-RU 736, O-DU 704, and O-CU 712 network functions towards SMO 728 (via near-RT RIC 726). An E2 interface 738 is also shown to near-RT RIC 726. An open FH-management plane interface 744 is shown between SMO 728 and O-RUs 736.

FIG. 8 shows an example of an SD-PON transport network 800. The architecture is similar to that shown in FIG. 7, except fiber technologies are used instead of cable technologies. Specifically, a PON midhaul 802 is formed between ONTs 804 and an OLT 806. A virtual OLT (VOLT) 808 is also provided for R-PHY and R-MACPHY. A PON control and management system (PCMS) 810 manages PON midhaul 802. As explained previously, SMO 728 generates triggers to switch the traffic across transport network options.

Referring to FIG. 9, a RIC Request ID 902 includes RIC Requestor ID and RIC Instance ID, which may be generated by the near-RT RIC (e.g., near-RT RIC 104 of FIG. 1 and FIG. 2). RAN Function ID 904 indicates the RAN Function ID number, which may be unique within a given E2 node (e.g., one of E2 node 202 of FIG. 2). For RIC Event Trigger Definition 906, the near-RT RIC may use E2SM-RC Event Trigger Definition Format 1: Message Event 908, which is discussed with reference to FIG. 10.

In this embodiment, up to 16 actions may be configured. For reporting of CPU and memory utilization, only one action is defined in this embodiment. RIC Action ID 910 indicates the Action ID number, to be unique within the given RIC Request ID 902. RIC Action Type 912 value may be set to Report for reporting CPU and memory utilization. RIC Action Definition 914 may use Action Definition format 1.

Referring to FIG. 10, a RIC Event Trigger Definition IE style is used to detect an E2 node related information change from the subscribed E2 node. The E2 node may also be configured to detect multiple changes simultaneously and to trigger when all the configured changes happen or for any logical combination of the configured changes.

For each information change configured for event triggering, Event Trigger Condition ID 1002 is also assigned so that E2 node may reply to near-RT RIC in the RIC indication message to inform the near-RT RIC of which event or events are the cause for triggering. Event Trigger Condition ID 1002 defines an identifier for event trigger conditions configured for a specific event trigger style. Any value in a range of 1 to 65535 may be assigned.

E2 Node Information Change ID 1004 may be encoded as 4 to indicate CPU and memory utilization reporting. If the CPU and/or memory utilization changes by 1 percentage, then RIC indication may be triggered by E2 node.

Referring to FIG. 11, a new E2 Node Information Change ID 1102 is introduced to the table of FIG. 11 with a value 4 to indicate E2 Node Information Change Type 1104 as CPU and memory utilization change.

Referring to FIG. 12, the Action Definition for this service style indicates the E2 node related information requested by the near-RT RIC. RIC Action Definition will use E2SM-RC Action Definition Format 1 1202 defined for Report. RIC Action Definition will use E2SM-RC Action Definition Format 1 including parameters to be reported list 1204 with RAN Parameter ID 1206 set to 4. RAN Parameter ID 4 indicates CPU and memory utilization.

Referring to FIG. 13, RAN Parameters for Report Service Style 3 table is updated with RAN Parameter ID 4 to indicate reporting of CPU and memory utilization information 1302 at E2 node.

Referring to FIG. 14, in a RIC subscription response, RIC Request ID 1402, RAN Function ID 904, and RIC Action ID 1404 will use the same value as indicated in a RIC subscription request. If the E2 node is unable to handle received request for reporting CPU and memory utilization, then RIC Actions Not Admitted List 1406 may be filled with an indication of failure with failure cause.

Referring to FIG. 15, RIC indication may use a RIC Request ID 1502, RAN Function ID 1504, and RIC Action ID 910 as a received part of the RIC subscription request for reporting of CPU and memory utilization. RIC Indication SN 1506 indicates the RIC indication sequence number that uniquely identifies a particular RIC indication. The value for RIC Indication SN 1506 may be in a range of 0 to 65535.

RIC Indication Type 1508 is set to report, which will report CPU and memory utilization in the E2 node. RIC Indication Header 1510 uses E2SM-RC Indication Header Format 1 and RIC Indication Message 1512 uses E2SM-RC Indication Message Format 3. RIC indication will be triggered by the E2 node when there is a change of CPU and/or memory utilization by 1 percentage, i.e., if there is either increase or decrease in CPU and/or memory utilization by 1 percentage in any of the configured CPU Core ID and/or Memory Pool, then RIC indication is triggered by the E2 node.

Referring to FIG. 16, the RIC Indication Header uses E2SM-RC Indication Header Format 1, which contains the same Event Trigger Condition ID 1602 received as part of RIC subscription request (e.g., Event Trigger Condition ID 1002 of FIG. 10). The RIC indication message uses E2SM- RC Indication Message Format 3 for reporting CPU and memory utilization in the E2 node. The information of CPU and memory utilization is sent per cell and the maximum number of cells for which CPU and memory utilization can be reported is 65535.

For each cell, the information of CPU and memory utilization information includes NR CGI and CPU and memory utilization information 1604. CPU and memory utilization information 1604 provides information about CPU usage across different configured core along with memory usage in each of the memory pools.

Referring to FIG. 17, CPU and memory utilization information includes information about CPU utilization 1702 across different CPU core ID 1704 and memory pool ID 1706. CPU core utilization may include information about CPU usage of up to 65535 memory pools. For each CPU core ID 1704, the reporting information includes CPU core ID 1704, CPU core name 1708, and percentage of CPU usage 1710 for the indicated CPU core ID 1704. Similarly, memory utilization 1712 may include information about memory utilization of up to 65535 memory pools. For each memory pool utilization reporting carries information related to memory pool ID 1706 and percentage of memory usage 1714 for the indicated memory pool ID 1706.

Figure 18:
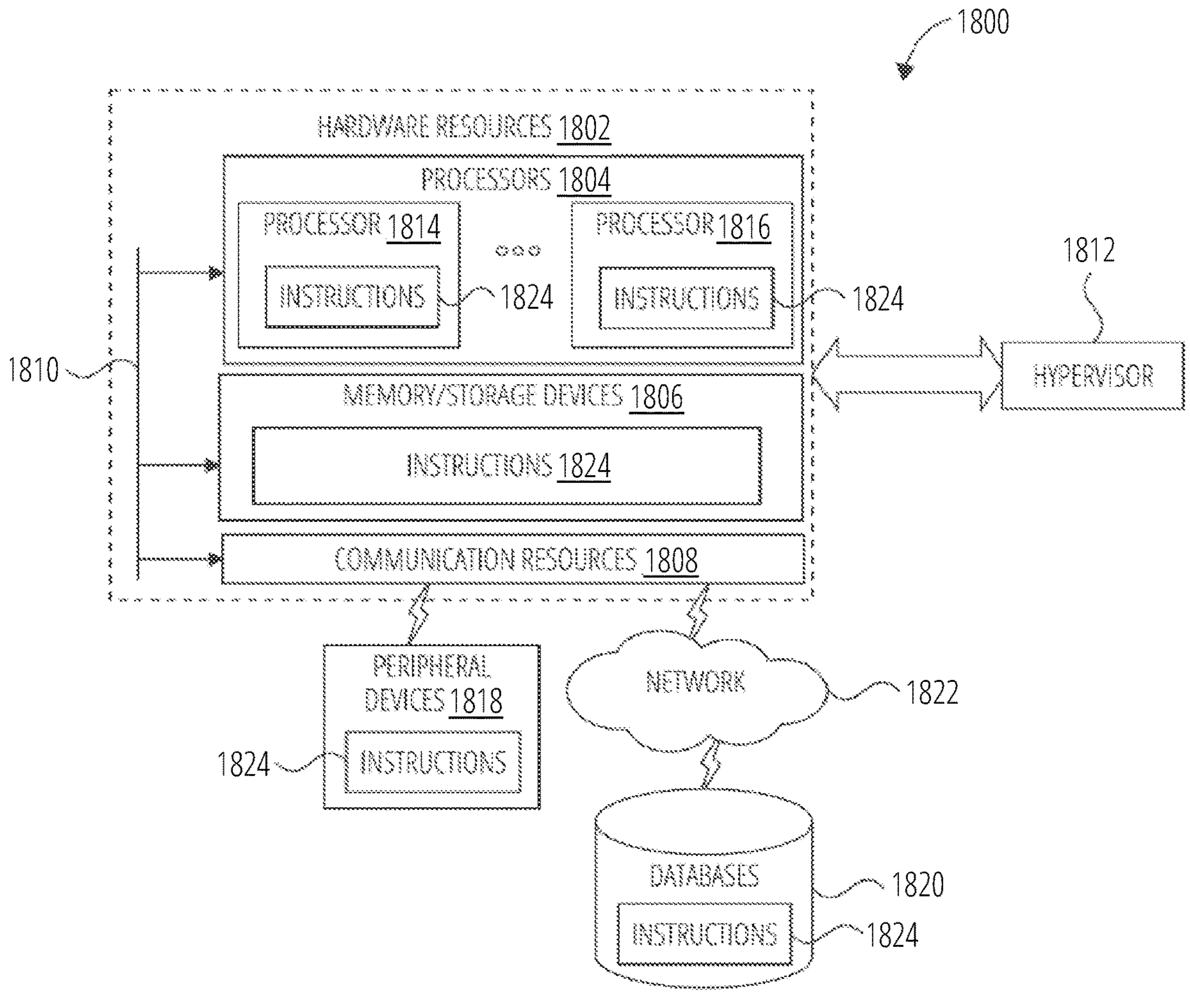
FIG. 18 is a block diagram of computing components for performing the disclosed procedures, in accordance with some embodiments.

FIG. 18 is a block diagram illustrating components 1800, according to some example embodiments, configured to read instructions from a machine-readable or computer-readable medium (e.g., a non-transitory machine-readable storage medium) and perform any one or more of the operations discussed herein (or portions thereof), such as operations performed by near-RT RIC 104, SMO 102, O-CU 110, O-DU 108, or O-RUs 116 of FIG. 1; operations performed by SMO 102, near-RT RIC 104, or E2 node 202 of FIG. 2; operations of call flow 300 of FIG. 3; operations of call flow 400 of FIG. 4; process 500 of FIG. 5; process 600 of FIG. 6; operations performed by SMO 728, near-RT RIC 726, O-RU 736, O-DU 704, CM 706, or O-CU 712 of FIG. 7; or operations of ONTs 804 of FIG. 8.

Specifically, FIG. 18 shows a diagrammatic representation of hardware resources 1802 including one or more processors 1804 (or processor cores), one or more memory/storage devices 1806, and one or more communication resources 1808, each of which may be communicatively coupled via a bus 1810. For embodiments where node virtualization (e.g., NFV) is utilized, a hypervisor 1812 may be executed to provide an execution environment for one or more network slices/sub-slices to utilize hardware resources 1802.

Processors 1804 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1814 and a processor 1816.

Memory/storage devices 1806 may include main memory, disk storage, or any suitable combination thereof. Memory/storage devices 1806 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1808 may include interconnection or network interface components or other suitable devices to communicate with one or more peripheral devices 1818 or one or more databases 1820 via a network 1822. For example, communication resources 1808 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1824 may comprise software, a program, an application, an applet, an app, or other executable code for causing at least any of processors 1804 to perform any one or more of the methods discussed herein. Instructions 1824 may reside, completely or partially, within at least one of processors 1804 (e.g., within the processor's cache memory), memory/storage devices 1806, or any suitable combination thereof. Furthermore, any portion of instructions 1824 may be transferred to hardware resources 1802 from any combination of peripheral devices 1818 or databases 1820. Accordingly, the memory of processors 1804, memory/storage devices 1806, peripheral devices 1818, and databases 1820 are examples of computer-readable and machine-readable media.

In the context of the above-disclosed embodiments, an apparatus of a near-RT RIC (e.g., near-RT RIC 104 of FIG. 1 and FIG. 2, near-RT RIC 726 of FIG. 7) may be implemented using components 1800. The apparatus may include a data storage device implemented by storage devices 1806, the storage device to store one or more input parameters (e.g., input parameters 204 received via one or more of an E2 interface or an A1 interface). The apparatus also includes one or more processors implemented by processors 1804, the one or more processors to dynamically determine cell reselection priority for a plurality of O-RUs (e.g., O-RUs 116 of FIG. 1, O-RU 736 of FIG. 7) in a fifth generation (5G) open RAN system (e.g., a 5G open RAN system represented by O-RAN architecture 100 of FIG. 1) responsive to the one or more input parameters.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. An apparatus of a near-real-time radio access network (RAN) intelligent controller (near-RT RIC), the apparatus comprising:

a data storage device to store one or more input parameters received via one or more of an E2 interface or an A1 interface, the one or more input parameters including a number of user equipment (UE) devices in each cell across each absolute radio frequency channel number (ARFCN) configured as a neighbor of a serving cell; and one or more processors to dynamically determine, based on the one or more input parameters, a cell reselection priority for a cell provided by an open RAN (O-RAN) radio unit (O-RU) in a fifth generation (5G) communication system.

2. The apparatus of claim 1, wherein the one or more processors further dynamically determine a cell reselection sub-priority responsive to the one or more input parameters.

3. The apparatus of claim 1, wherein the one or more input parameters include a tracking area code (TAC) and a RAN notification area (RNA).

4. The apparatus of claim 1, wherein the one or more input parameters include cell bandwidths of neighbor cells.

5. The apparatus of claim 1, wherein the one or more input parameters include frequencies of neighbor cells.

6. The apparatus of claim 1, wherein the one or more input parameters include device capabilities of one or more user equipment (UE) devices.

7. The apparatus of claim 1, wherein the one or more input parameters include a number of bearers or packet data unit (PDU) sessions established in neighbor cells.

8. The apparatus of claim 1, wherein the one or more input parameters include available slices in a target cell.

9. The apparatus of claim 1, wherein the one or more input parameters include central processing unit (CPU) and memory utilization in a neighbor cell node.

10. The apparatus of claim 1, wherein the one or more input parameters include a service flow parameter.

11. The apparatus of claim 1, wherein the one or more input parameters include an indicator of support for radio resource control (RRC) inactive states.

12. The apparatus of claim 1, wherein the one or more input parameters include a transport network path indicator.

13. A method, performed by a near-real time radio access network (RAN) intelligent controller (near-RT RIC) in an open RAN (O-RAN) 5G system (5GS), of changing a cell reselection priority and sub-priority for intra-frequency neighbor cells, inter-frequency neighbor cells, or inter-RAT neighbor cells, the method comprising:

engaging in an E2 setup establishment with an E2 node;

engaging in an A1 connection establishment with a RAN service management and orchestrator (SMO);

participating in a RIC subscription procedure with the E2 node;

participating in a query policy procedure with the SMO;

receiving one or more input parameters from one or more of the E2 node and the SMO . . . the one or more input parameters including a number of user equipment (UE) devices in each cell across each absolute radio frequency channel number (ARFCN) configured as a neighbor of a serving cell; and dynamically determining a cell reselection priority and sub-priority based on the one or more input parameters received from one or more of the E2 node or the SMO.

14. The method of claim 13, further comprising triggering a RIC control procedure with the E2 node to cause it to broadcast an updated SIB2, SIB4, or SIB5 with the cell reselection priority and sub-priority.

15. The method of claim 13, further comprising triggering a RIC control procedure with the E2 node to cause it to generate an RRC release message with the cell reselection priority and sub-priority for a UE moving to an RRC idle or inactive state.

16. A method, performed by an E2 node in an open RAN (O-RAN) 5G system (5GS), of changing a cell reselection priority and sub-priority for intra-frequency neighbor cells, inter-frequency neighbor cells, or inter-RAT neighbor cells, the method comprising:

engaging in an E2 setup establishment with a near-real time radio access network (RAN) intelligent controller (near-RT RIC);

providing the near-RT RIC with input parameters that the near-RT RIC uses to determine an updated cell reselection priority and sub-priority, the input parameters including a number of user equipment (UE) devices in each cell across each absolute radio frequency channel number (ARFCN) configured as a neighbor of a serving cell;

receiving from the near-RT RIC a RIC control request with the updated cell reselection priority and sub-priority; and signaling the updated cell reselection priority and sub-priority towards a UE.

17. The method of claim 16, further comprising signaling the updated cell reselection priority and sub-priority at the cell level by broadcasting a SIB.

18. The method of claim 16, further comprising signaling the updated cell reselection priority and sub-priority at the UE level using an RRC release message.

* * * * *